(12) United States Patent
Tomberg

(10) Patent No.: US 6,910,864 B2
(45) Date of Patent: Jun. 28, 2005

(54) TURBINE BUCKET AIRFOIL COOLING HOLE LOCATION, STYLE AND CONFIGURATION

(75) Inventor: Steven E. Tomberg, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 42 days.

(21) Appl. No.: 10/653,349

(22) Filed: Sep. 3, 2003

(65) Prior Publication Data

US 2005/0047914 A1 Mar. 3, 2005

(51) Int. Cl.$^7$ ................................................. F01D 5/18
(52) U.S. Cl. .................. 416/90 R; 416/96 R; 416/97 R
(58) Field of Search .............................. 415/115, 116, 415/90 R, 95, 96 R, 97 R, 96 A, 97 A; 416/90 R, 95, 96 R, 97 R, 96 A, 97 A

(56) References Cited

U.S. PATENT DOCUMENTS

| 3,329,596 | A | * | 7/1967 | Abt et al. .................... 205/652 |
| 5,117,626 | A | * | 6/1992 | North et al. .................. 60/806 |
| 5,413,463 | A | * | 5/1995 | Chiu et al. .................... 416/95 |

* cited by examiner

Primary Examiner—Edward K. Look
Assistant Examiner—Dwayne J. White
(74) Attorney, Agent, or Firm—Nixon & Vanderhye P.C.

(57) ABSTRACT

First, second and third sets of cooling holes are provided in a turbine airfoil. The first set of holes adjacent a leading edge have turbulators commencing at a predetermined distance from the root of the airfoil and terminating short of the airfoil tip. A second set of cooling holes have turbulators commencing at a greater distance from the platform than the turbulators of the first set and terminating short of the airfoil tip at a greater distance from the tip than the turbulators of the first set of holes. A third set of holes adjacent the trailing edge has smooth bores. The size, location, style and configuration of the cooling holes increases bulk creep part life and overall efficiency of the turbine.

17 Claims, 7 Drawing Sheets

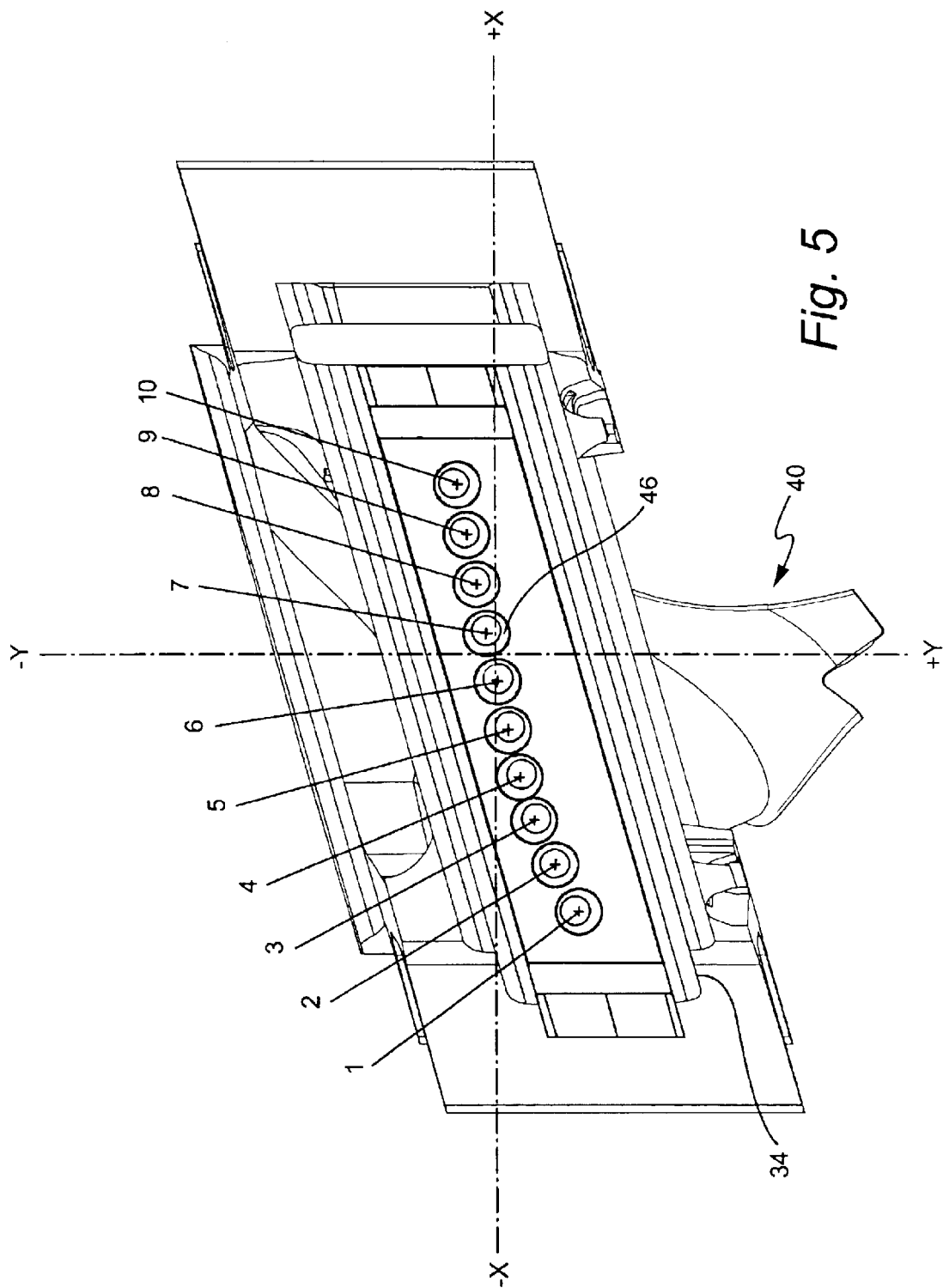

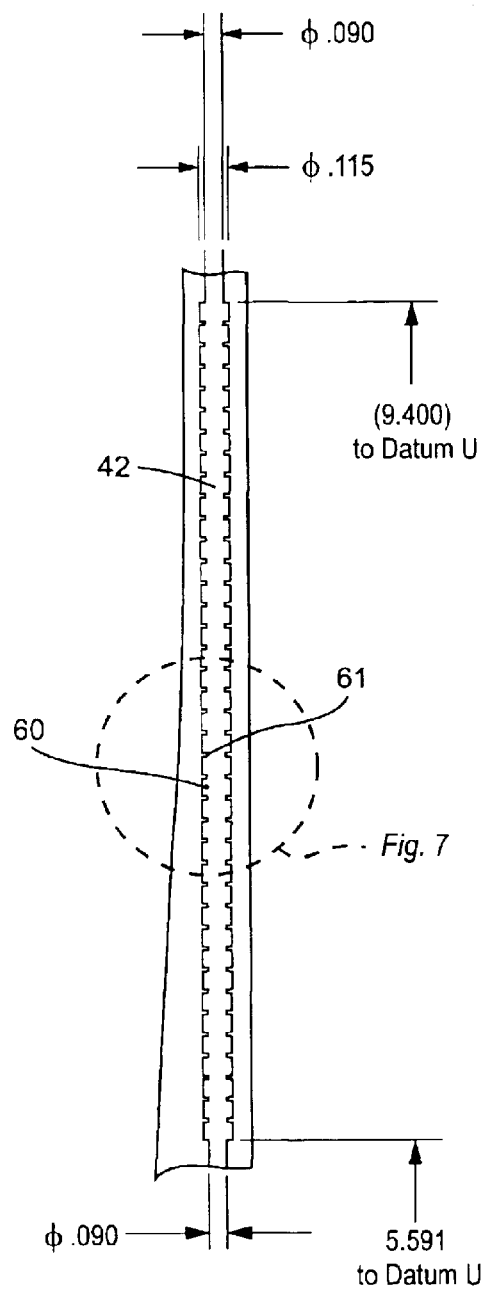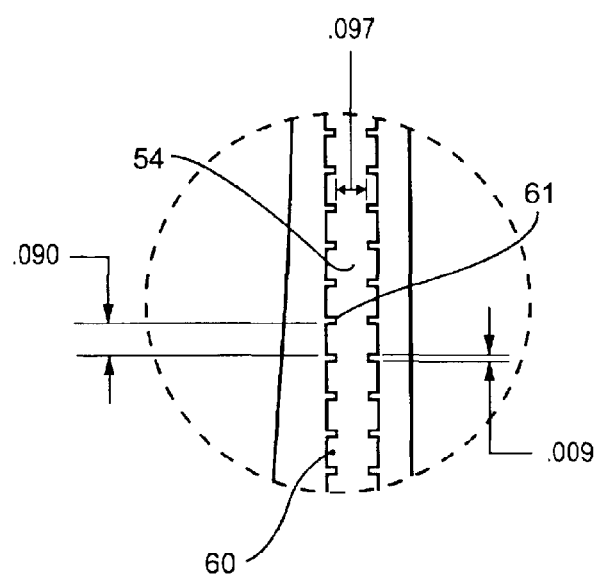
Fig. 7
Fig. 6

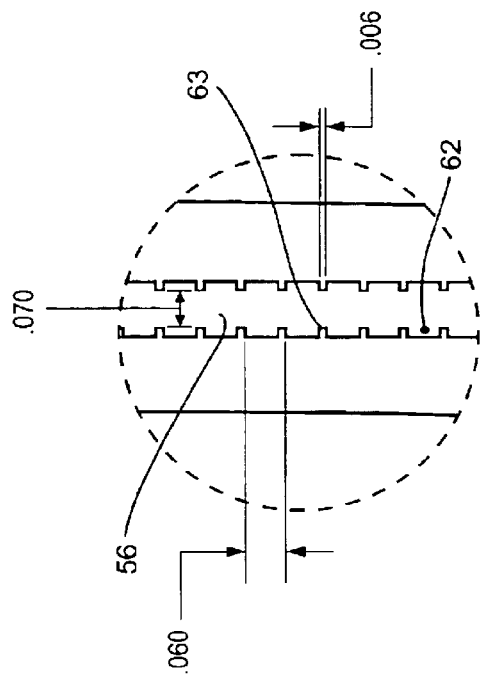
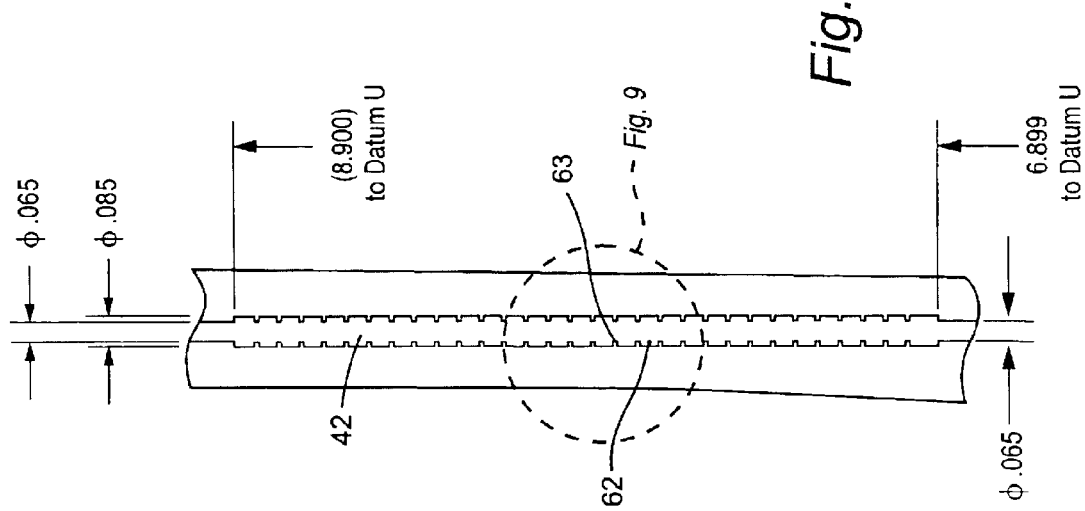
Fig. 9
Fig. 8

US 6,910,864 B2

TURBINE BUCKET AIRFOIL COOLING HOLE LOCATION, STYLE AND CONFIGURATION

BACKGROUND OF THE INVENTION

The present invention relates to an airfoil for a bucket of a stage of a gas turbine and particularly relates to a stage two bucket airfoil having an optimized number, location, style and size of cooling holes for flowing a cooling medium, e.g., air, through the airfoil.

Many different types, numbers and locations of passages for flowing a cooling medium, e.g., air, through an airfoil of a turbine bucket for cooling the airfoil have been proposed and constructed. Where air is used as the cooling medium, it will be appreciated that the air is derived from the compressor and therefore results in a debit to the overall efficiency of the turbine. In prior cooling configurations for turbine buckets, compressor discharge air is supplied to the airfoil through cooling passages formed integrally within the bucket. Insufficient cooling, however, affects bulk creep part life which in turn limits the life of the part to a predetermined number of hours of turbine operation. Accordingly, a more effective cooling scheme which decreases the bulk temperature of the bucket and increases the bucket's bulk creep life is deemed necessary.

BRIEF DESCRIPTION OF THE INVENTION

In accordance with a preferred embodiment of the present invention, there is provided a bucket having an airfoil in which the number, location, style and size of the cooling holes or passages through the airfoil which convey the cooling medium increase the overall efficiency of the turbine and meet bucket life requirements, particularly by increasing the bulk creep part life. To accomplish the foregoing, the cooling holes are arranged optimally within the airfoil in accordance with X, Y coordinates set forth in Table I below. The size of the holes limits the amount of air flow based on a pressure difference across the bucket airfoil. The location of the holes determines the temperature of every finite element making up the bucket airfoil. The style reflects the way in which the heat transfer occurs along the walls of each cooling hole, i.e., turbulators at selected locations are used to enhance heat transfer. These attributes together create an efficient optimal cooling scheme for the turbine bucket.

In a preferred embodiment according to the present invention, there is provided an air cooled bucket for a turbine comprising an airfoil having a plurality of cooling holes extending between root and tip portions of the airfoil and exiting at the tip of the airfoil, the plurality of cooling holes including first, second and third sets of holes with each set of holes having at least two holes, the first set of holes extending adjacent a leading edge of the airfoil, the second set of holes extending intermediate the first and third sets of holes and the third set of holes extending adjacent the trailing edge, the two holes of each of the first, second and third sets of holes including at least two of the holes numbered 1–4, 5–7 and 8–10, respectively, and located in accordance with X, Y Cartesian coordinate values set forth in Table I below at tip and root portions of the airfoil.

In a further preferred embodiment according to the present invention, there is provided an air cooled bucket for a turbine comprising an airfoil having a plurality of cooling holes extending between root and tip portions of the airfoil and exiting at the tip of the airfoil, the plurality of cooling holes including first, second and third sets of holes with each set of holes having at least two holes, the first set of holes extending adjacent a leading edge of the airfoil, the second set of holes extending intermediate the first and third sets of holes and the third set of holes extending adjacent the trailing edge, the two holes of one of the first set of holes and the second set of holes having turbulators spaced one from the other along the holes and terminating short of the root and tip portions of the airfoil.

BRIEF DESCRIPTION OF THE DRAWINGS

FIG. 5 is a radially outward view of the bucket illustrating inlets for the cooling passages in the dovetail of the bucket;

FIG. 6 is a cross-sectional view about line 6—6 in FIG. 2;

FIG. 7 is an enlarged cross-sectional view taken in FIG. 6;

FIG. 8 is an enlarged cross-sectional view taken about on line 8—8 in FIG. 2;

FIG. 9 is an enlarged cross-sectional view of a portion of the airfoil and passage of FIG. 8.

DETAILED DESCRIPTION OF THE INVENTION

Figure 1:
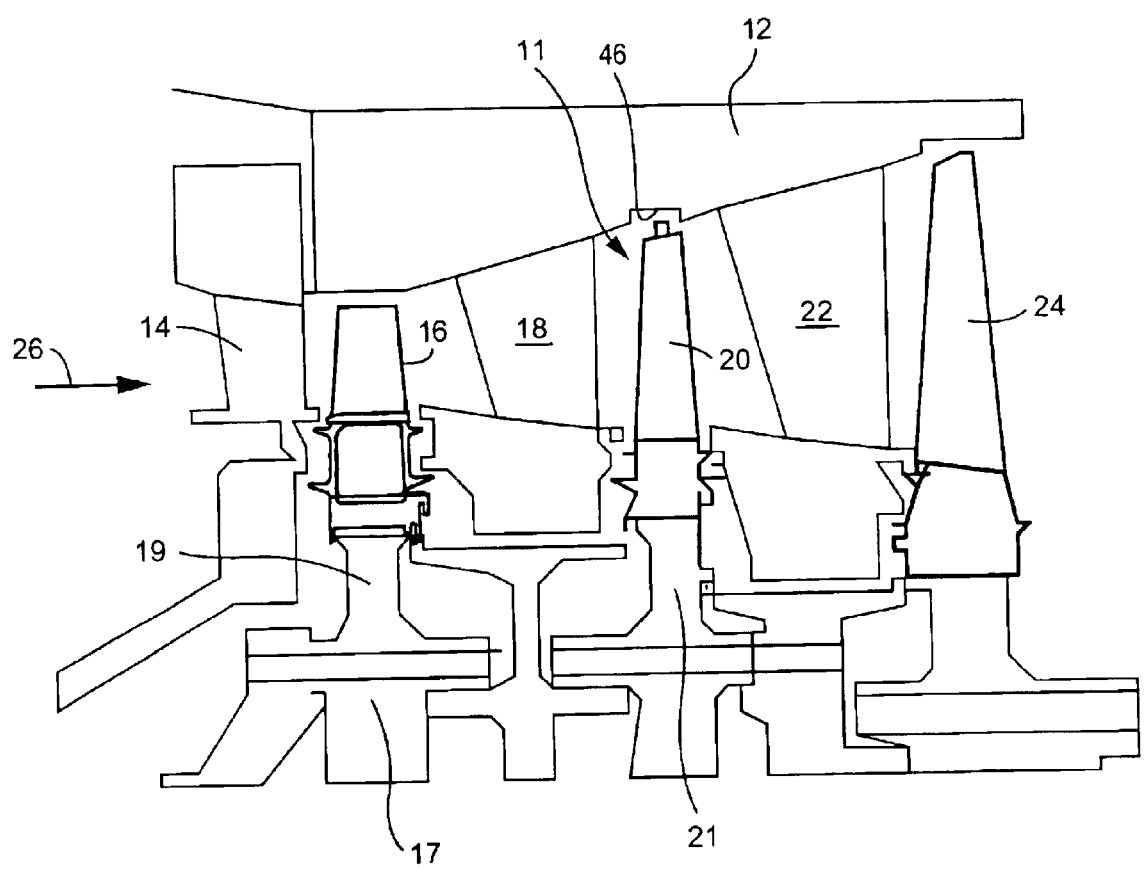
FIG. 1 is a schematic representation of a hot gas path through multiple stages of a gas turbine and illustrates a second stage bucket airfoil according to a preferred embodiment of the present invention.

Referring now to the drawing figures, particularly to FIG. 1, there is illustrated a hot gas path, generally designated 11, of a gas turbine 12 including a plurality of turbine stages. Three stages are illustrated. For example, the first stage comprises a plurality of circumferentially spaced nozzles 14 and buckets 16. The nozzles are circumferentially spaced one from the other and fixed about the axis of the rotor. The first stage buckets 16, of course, are mounted on a turbine rotor wheel 17. A second stage of the turbine 12 is also illustrated, including a plurality of circumferentially spaced nozzles 18 and a plurality of circumferentially spaced buckets 20 mounted on a rotor wheel 21. The third stage is also illustrated including a plurality of circumferentially spaced nozzles 22 and buckets 24 mounted on the rotor. It will be appreciated that the nozzles and buckets lie in the hot gas path 10 of the turbine 12, the direction of flow of the hot gas through the hot gas path 10 being indicated by the arrow 26.

Figures 2, 10:
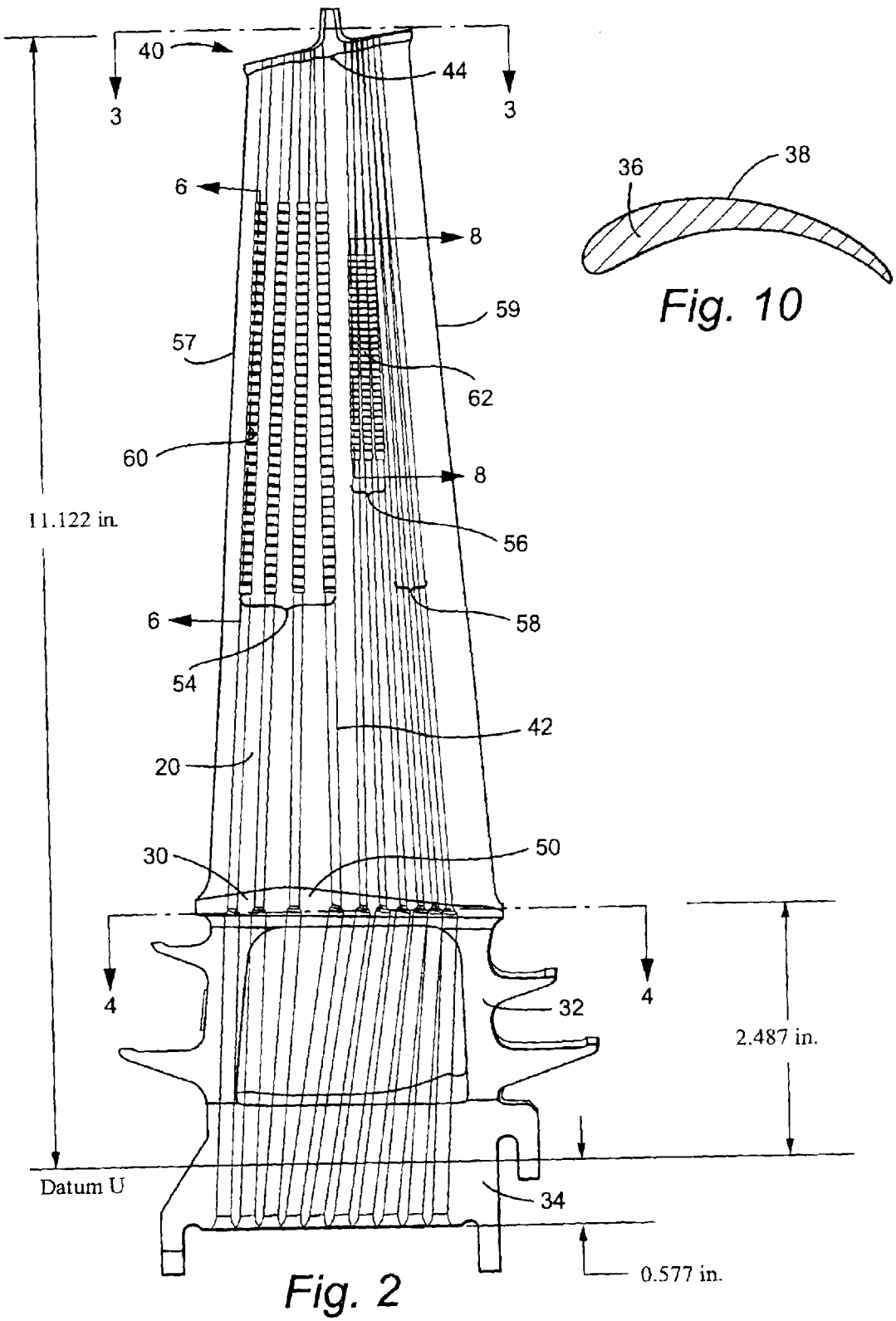
FIG. 2 is a side elevational view of the second stage bucket illustrated from the pressure side of the airfoil, with the side of the bucket broken away to illustrate internal cooling passages through the bucket; in accordance with a preferred embodiment of the present invention.
FIG. 10 is a schematic representation of an airfoil profile section along the bucket of FIG. 2.

Referring to FIG. 2, each bucket 20 of the second stage is provided with a platform 30, a shank 32 and a dovetail 34 for connection with a complementary-shaped mating dovetail on rotor wheel 21 forming part of the rotor. Each of the second stage buckets 20 also includes an airfoil 36 having an airfoil profile at any cross-section along the airfoil from the platform to the airfoil tip, as schematically illustrated by the profile section 38 in FIG. 10.

Each of the second stage buckets 20 is also provided with a tip shroud, generally designated 40 (FIG. 2). The tip shrouds 40 are preferably formed integrally with the buckets and each tip shroud engages at opposite ends adjacent tip shrouds of adjacent buckets to form a generally annular ring or shroud circumscribing the hot gas path at the axial location of the second stage buckets.

Figure 3:
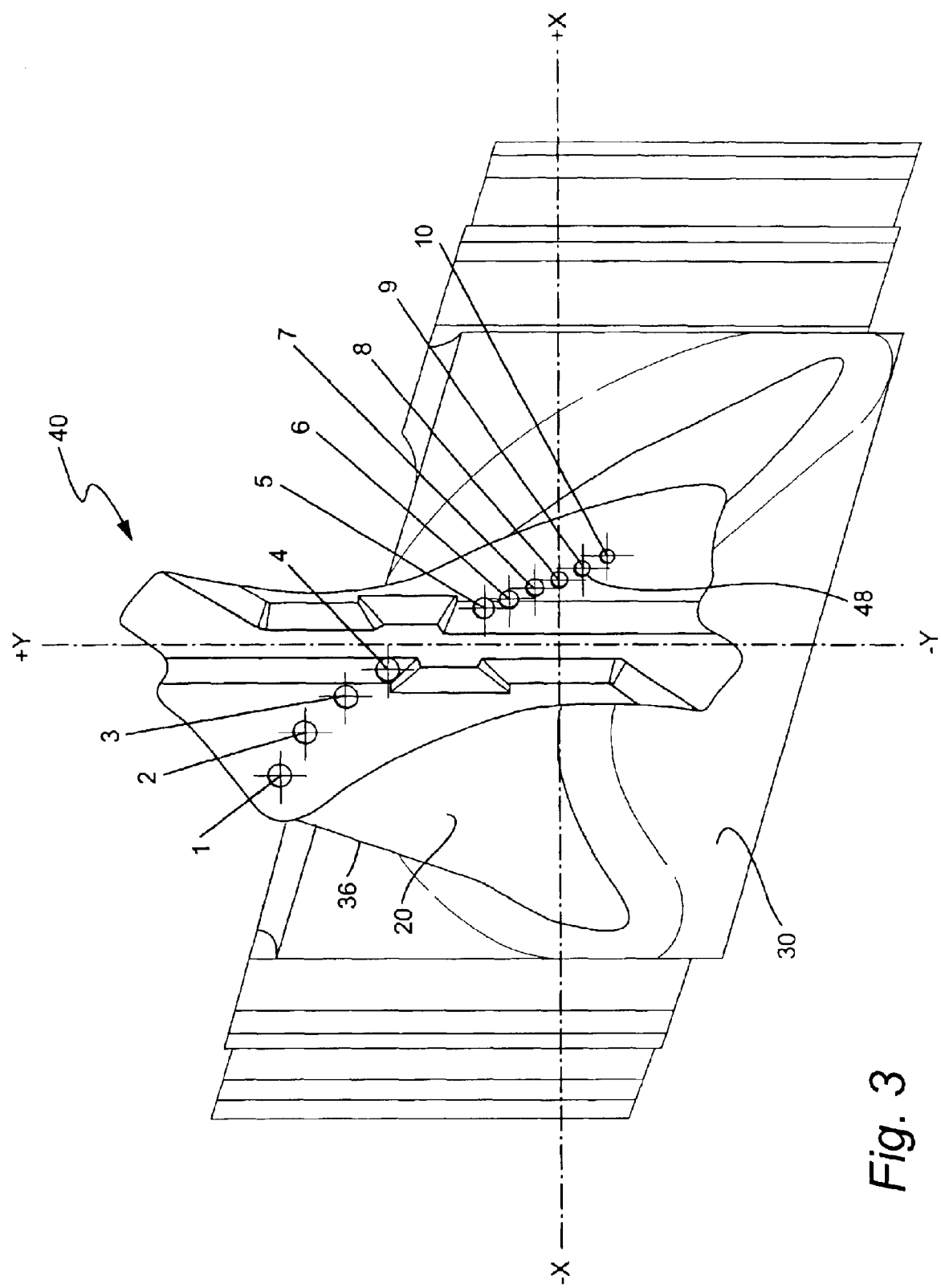
FIG. 3 is an enlarged radial inward view of the airfoil tip shroud illustrating the locations of the cooling hole exits.

As best illustrated in FIG. 2, the bucket 20 includes a plurality of cooling holes extending between the dovetail 34 and the tip 44 of the airfoil 36. Thus, as best illustrated in FIG. 5, the dovetail 34 has a plurality of inlets 46 in communication with respective holes 42. Tip 44, as illustrated in FIG. 3, includes a plurality of outlets 48 through the tip shroud 40 in communication with respective holes 42. Accordingly, the cooling medium, e.g., air from the turbine compressor, enters the inlets 46, passes through the cooling holes 42 and exits from the tip 44 of the airfoil through shroud 40 into the hot gas stream.

As illustrated in FIG. 2, the cooling holes 42 extend between a root portion 50 and the tip 44 of the airfoil and continue through the shank 32 and dovetail 34. The plurality of cooling holes 42 through the airfoil includes first, second and third sets of holes 54, 56 and 58, respectively. The first set of holes 54 extends adjacent a leading edge 57 of the airfoil. The second set of holes 56 extends intermediate the first and third sets of holes 54 and 58, respectively. The third set of holes 58 extends adjacent the trailing edge 59. Each of the first, second and third sets of the plurality of cooling holes 42 includes at least two holes. For convenience, the holes of the plurality of holes 42 are numbered 1 through 10 in Table I below. As indicated, the first set of holes 54 comprises holes numbered 1–4, the second set of holes 56 comprises numbered holes 5–7 and located along holes 42 and terminate short of the root 50 and tip 44 of the airfoil 36. More particularly, the turbulators 60 of the first set of holes 54 commence at a distance of about 30–40% and, more preferably, about 36% of the length of the airfoil from the root to the tip. The turbulators 60 of the first set of holes 54 terminate or end at about 75–85% of the airfoil length, preferably about 80% of the airfoil length from the root to the tip. The turbulators 62 of the second set of holes 56 commence at about 45–55% of the length of the airfoil from root to tip, and preferably at about 51% of the length of the airfoil from root to tip. The turbulators 62 of the second set of holes 56 terminate at about 70–80% of the airfoil length, preferably at about 74% of the length from root to tip.

Figure 4:
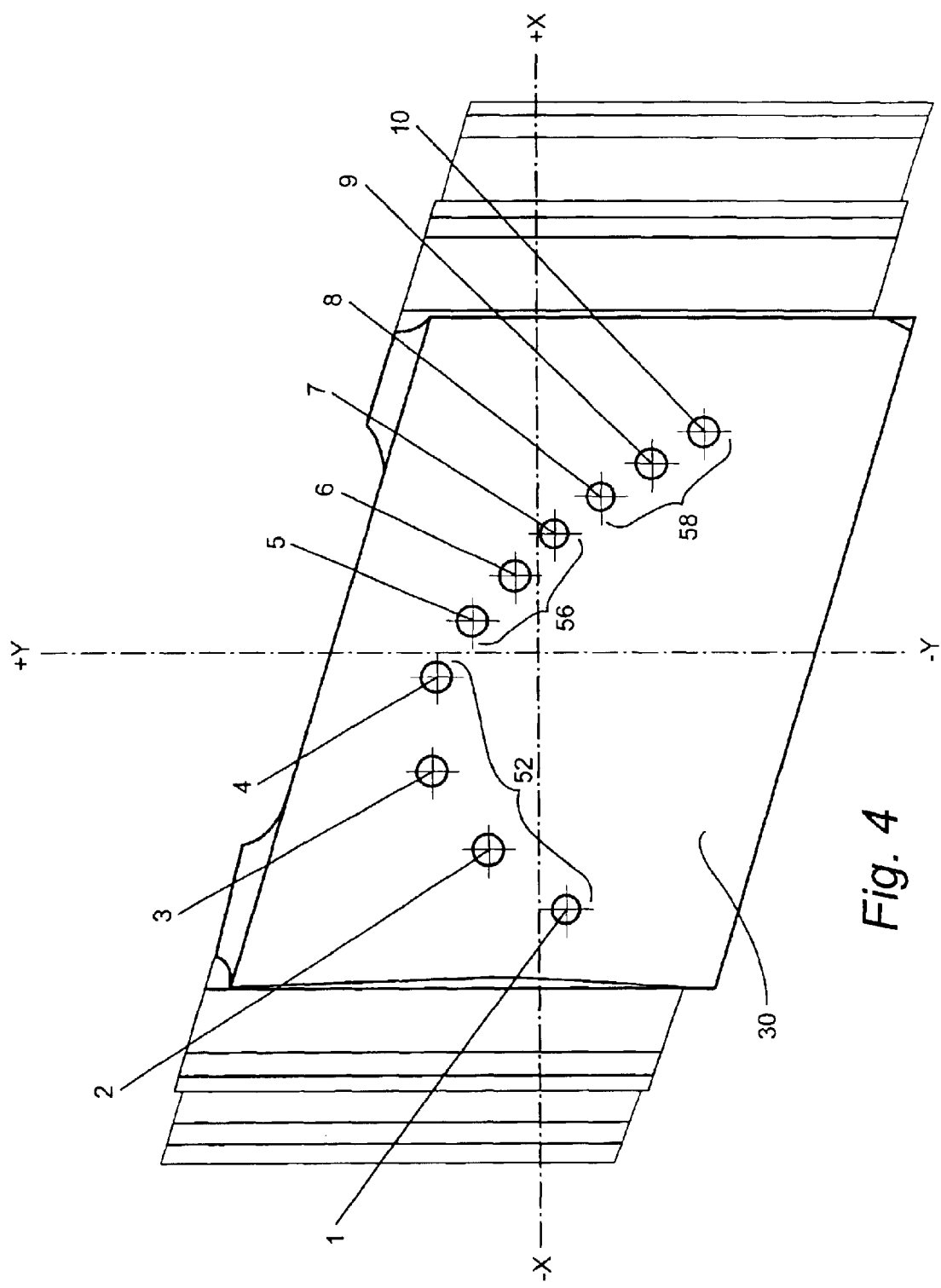
FIG. 4 is an enlarged cross-sectional view thereof taken generally about on line 4—4 in FIG. 2.

With reference to FIGS. 6 and 7, the diameter of the first set of holes 54 is larger than the diameter of the second set of holes 56. In a preferred embodiment, the diameters of (i) the smooth bore portion of the first set of holes 54 between the root portion of the airfoil and the commencement of turbulators 60 and (ii) the smooth bore portion from the outermost turbulator 60 to the tip 44 are about 0.090 inches. The outer diameter of the turbulated holes 54 between ribs 61 is about 0.115 inches. The inner diameter of the ribs 61 is about 0.097 inches. The ribs 61 have a thickness or axial depth, preferably about 0.009 inches and are equally spaced one from the other a distance about 0.090 inches. With reference to FIGS. 8 and 9, the diameters of (i) the smooth bore portion of the second set of holes 56 from the root to the commencement of the turbulators 62 and (ii) the smooth bore portion from the last outboard the third set of holes 58 comprise numbered holes 8–10 in Table I and as illustrated in FIGS. 3–5.

Each of the holes 42 of the first set of holes 54 includes a plurality of turbulators 60 at spaced locations from one another along predetermined portions of each hole between the root and tip portions of the airfoil. Similarly, each of the holes 42 of the second set of holes 56 includes a plurality of turbulators 62 at spaced locations from one another along predetermined portions of the holes between the root and tip portions of the airfoil. The third set of holes 58 do not include turbulators and have smooth bores between the root and tip portions of the airfoil.

The turbulators 60 of the first set of holes 54 include radially inwardly projecting annular ribs 61 at spaced locations along predetermined portions of the holes 54. The turbulators 62 of the second set of holes 56 likewise include radially inwardly projecting annular ribs 63 at spaced locations along predetermined portions of the holes between the root and tip portions of the airfoils. It will be appreciated that while radially inwardly projecting annular ribs are disclosed as forming turbulators 60, 62, other types of turbulators may be utilized. For example, interrupted annular ribs, pins projecting radially into the bores or dimpled or roughened surfaces may be utilized.

As noted above, the turbulators 60 and 62 of the first and second sets of openings 54 and 56, respectively, are provided along predetermined portions of the respective holes. The turbulators 60 and 62 are turbulator 62 to the tip of the airfoil are about 0.065 inches. Ribs 6 are equally spaced from one another about 0.060 inches. The outer diameter of the turbulators 62 between ribs 63 of the second set of holes 56 is about 0.085 inches. The inner diameter of the ribs 63 is about 0.070 inches. The ribs 63 have a thickness or axial depth preferably about 0.006 inches. The ribs 63 are equally spaced from one another along the bore of the second set of holes 56 a distance of about 0.060 inches. The ribs are equally spaced one from the other.

In a preferred aspect of the invention having ninety-two second stage buckets, a datum U (FIG. 2) is established passing through the dovetail 34 at 24.100 inches from the engine centerline. The root portion 50 of the airfoil is 2.487 inches radially outwardly of datum U, i.e., 26.587 inches from the engine centerline. The turbulators 60 commence preferably about 5.591 inches from datum U and terminate preferably 9.400 inches from datum U. The smooth bore portion of the second set of holes 56 extends from the datum preferably about 6.899 inches to the first turbulator 62. The last of the turbulators 62 of the second set of holes 56 is preferably about 8.900 inches from the datum U. From a review of FIG. 2, it will be appreciated that the holes 42 in the shank 32 and dovetail 34 of the bucket have smooth bores.

The location of the cooling holes numbered 1–10 are given in Table I in a Cartesian coordinate system using X and Y values at the tip and root portions of the airfoil. Also, the X and Y coordinate values for the inlet openings 46 through the dovetail 34 of the holes 42 are also given in Table I. The hole diameter from the root portion of the airfoil to the inlet openings 46 is about 0.140 inches.

TABLE I

| Hole Number | Hole Diameter From Tip to Root | Nominal Hole Diameter From Root To Inlet 46 | Tip | | Root | | Inlet 46 | |
|---|---|---|---|---|---|---|---|---|
| | | | "X" | "Y" | "X" | "Y" | "X" | "Y" |
| 1 | See FIG. 6 | 0.140 | −0.596 | 1.319 | −1.111 | −0.142 | −1.240 | 0.468 |
| 2 | | | −0.389 | 1.185 | −0.857 | 0.197 | −1.011 | 0.355 |
| 3 | | | −0.235 | 0.990 | −0.514 | 0.446 | −0.794 | 0.253 |
| 4 | | | −0.120 | 0.793 | −0.109 | 0.433 | −0.583 | 0.183 |
| 5 | See FIG. 8 | | 0.174 | 0.339 | 0.149 | 0.285 | −0.355 | 0.129 |
| 6 | | | 0.225 | 0.227 | 0.338 | 0.106 | −0.119 | 0.079 |

TABLE I-continued

| Hole Number | Hole Diameter From Tip to Root | Nominal Hole Diameter From Root To Inlet 46 | Tip | | Root | | Inlet 46 | |
|---|---|---|---|---|---|---|---|---|
| | | | "X" | "Y" | "X" | "Y" | "X" | "Y" |
| 7 | | | 0.268 | 0.111 | 0.531 | −0.069 | 0.117 | 0.028 |
| 8 | 0.060 | | 0.315 | −0.003 | 0.702 | −0.265 | 0.355 | −0.020 |
| 9 | | | 0.371 | −0.111 | 0.843 | −0.483 | 0.597 | −0.066 |
| 10 | | | 0.430 | −0.217 | 0.979 | −0.704 | 0.840 | −0.111 |

To define the airfoil shape of each second stage bucket airfoil, there is a unique set or loci of points in space that meet the stage requirements and can be manufactured. This unique loci of points meets the requirements for stage efficiency and reduced thermal and mechanical stresses. The loci of points are arrived at by iteration between aerodynamic and mechanical loadings enabling the turbine to run in an efficient, safe and smooth manner. The loci which defines the bucket airfoil profile comprises a set of 1320 points relative to the axis of rotation of the turbine. A Cartesian coordinate system of X, Y and Z values given in Table II below define the profile of the bucket airfoil at various locations along its length. The coordinate values for the X and Y coordinates are set forth in inches in Table II although other units of dimensions may be used when the values are appropriately converted. The Z values are set forth in Table II in non-dimensional form from 0.088 to 0.92. These values exclude the fillet regions of the platform and the tip shroud. To convert the Z value to a Z coordinate value, e.g., in inches, the non-dimensional Z value given in Table II is multiplied by the height of airfoil in inches. The Cartesian coordinate system has orthogonally-related X, Y and Z axes and the X axis lies parallel to the turbine rotor centerline, i.e., the rotary axis and a positive X coordinate value is axial toward the aft, i.e., exhaust end of the turbine. The positive Y coordinate value looking aft extends tangentially in the direction of rotation of the rotor and the positive Z coordinate value is radially outwardly toward the bucket tip.

By defining X and Y coordinate values at selected locations in a Z direction normal to the X, Y plane, the profile section of the bucket airfoil, e.g., the profile section 38 illustrated in FIG. 10, at each Z distance along the length of the airfoil can be ascertained. By connecting the X and Y values with smooth continuing arcs, each profile section 38 at each distance Z is fixed. The airfoil profiles of the various surface locations between the distances Z are determined by smoothly connecting the adjacent profile sections 38 to one another to form the airfoil profile. These values represent the airfoil profiles at ambient, non-operating or non-hot conditions and are for an uncoated airfoil.

The Table II values are generated and shown to three decimal places for determining the profile of the airfoil. There are typical manufacturing tolerances as well as coatings which must be accounted for in the actual profile of the airfoil. Accordingly, the values for the profile given in Table II are for a nominal airfoil. It will therefore be appreciated that ± typical manufacturing tolerances, i.e., ± values, including any coating thicknesses, are additive to the X and Y values given in Table II. Accordingly, a distance of ±0.160 inches in a direction normal to any surface location along the airfoil profile defines an airfoil profile envelope for this particular bucket airfoil design and turbine, i.e., a range of variation between measured points on the actual airfoil surface at nominal cold or room temperature and the ideal position of those points as given in Table II below at the same temperature. The bucket airfoil design is robust to this range of variation without impairment of mechanical and aerodynamic functions.

The coordinate values given in Table II below provide the preferred nominal profile envelope.

TABLE II

| X | Y | Z' | X | Y | Z' | X | Y | Z' |
|---|---|---|---|---|---|---|---|---|
| −1.291 | −0.288 | 0.088 | 0.492 | 0.262 | 0.088 | 0.901 | −0.765 | 0.088 |
| −1.313 | −0.230 | 0.088 | 0.533 | 0.214 | 0.088 | 0.859 | −0.718 | 0.088 |
| −1.317 | −0.167 | 0.088 | 0.573 | 0.165 | 0.088 | 0.816 | −0.672 | 0.088 |
| −1.312 | −0.104 | 0.088 | 0.612 | 0.115 | 0.088 | 0.772 | −0.626 | 0.088 |
| −1.300 | −0.042 | 0.088 | 0.650 | 0.065 | 0.088 | 0.728 | −0.581 | 0.088 |
| −1.282 | 0.018 | 0.088 | 0.687 | 0.014 | 0.088 | 0.684 | −0.537 | 0.088 |
| −1.260 | 0.077 | 0.088 | 0.722 | −0.038 | 0.088 | 0.638 | −0.493 | 0.088 |
| −1.233 | 0.135 | 0.088 | 0.757 | −0.091 | 0.088 | 0.592 | −0.450 | 0.088 |
| −1.203 | 0.190 | 0.088 | 0.792 | −0.144 | 0.088 | 0.544 | −0.408 | 0.088 |
| −1.169 | 0.243 | 0.088 | 0.825 | −0.197 | 0.088 | 0.496 | −0.368 | 0.088 |
| −1.132 | 0.294 | 0.088 | 0.858 | −0.251 | 0.088 | 0.447 | −0.328 | 0.088 |
| −1.092 | 0.343 | 0.088 | 0.890 | −0.306 | 0.088 | 0.397 | −0.290 | 0.088 |
| −1.050 | 0.390 | 0.088 | 0.922 | −0.360 | 0.088 | 0.346 | −0.253 | 0.088 |
| −1.004 | 0.434 | 0.088 | 0.953 | −0.415 | 0.088 | 0.293 | −0.218 | 0.088 |
| −0.957 | 0.475 | 0.088 | 0.984 | −0.470 | 0.088 | 0.240 | −0.185 | 0.088 |
| −0.907 | 0.513 | 0.088 | 1.014 | −0.525 | 0.088 | 0.185 | −0.153 | 0.088 |
| −0.854 | 0.549 | 0.088 | 1.045 | −0.581 | 0.088 | 0.129 | −0.124 | 0.088 |
| −0.800 | 0.581 | 0.088 | 1.075 | −0.636 | 0.088 | 0.072 | −0.097 | 0.088 |
| −0.744 | 0.610 | 0.088 | 1.105 | −0.692 | 0.088 | 0.014 | −0.073 | 0.088 |
| −0.686 | 0.635 | 0.088 | 1.135 | −0.747 | 0.088 | −0.046 | −0.051 | 0.088 |
| −0.627 | 0.657 | 0.088 | 1.164 | −0.803 | 0.088 | −0.106 | −0.033 | 0.088 |
| −0.566 | 0.675 | 0.088 | 1.194 | −0.859 | 0.088 | −0.167 | −0.018 | 0.088 |
| −0.505 | 0.688 | 0.088 | 1.224 | −0.914 | 0.088 | −0.230 | −0.007 | 0.088 |

TABLE II-continued

| X | Y | Z' | X | Y | Z' | X | Y | Z' |
|---|---|---|---|---|---|---|---|---|
| −0.442 | 0.698 | 0.088 | 1.253 | −0.970 | 0.088 | −0.292 | 0.001 | 0.088 |
| −0.380 | 0.702 | 0.088 | 1.282 | −1.026 | 0.088 | −0.355 | 0.005 | 0.088 |
| −0.317 | 0.703 | 0.088 | 1.312 | −1.082 | 0.088 | −0.418 | 0.006 | 0.088 |
| −0.254 | 0.698 | 0.088 | 1.341 | −1.138 | 0.088 | −0.481 | 0.003 | 0.088 |
| −0.191 | 0.689 | 0.088 | 1.371 | −1.193 | 0.088 | −0.544 | −0.004 | 0.088 |
| −0.130 | 0.675 | 0.088 | 1.394 | −1.251 | 0.088 | −0.606 | −0.015 | 0.088 |
| −0.069 | 0.657 | 0.088 | 1.353 | −1.289 | 0.088 | −0.668 | −0.029 | 0.088 |
| −0.010 | 0.635 | 0.088 | 1.306 | −1.249 | 0.088 | −0.728 | −0.047 | 0.088 |
| 0.048 | 0.610 | 0.088 | 1.267 | −1.199 | 0.088 | −0.788 | −0.068 | 0.088 |
| 0.104 | 0.581 | 0.088 | 1.227 | −1.151 | 0.088 | −0.846 | −0.092 | 0.088 |
| 0.159 | 0.549 | 0.088 | 1.187 | −1.102 | 0.088 | −0.903 | −0.119 | 0.088 |
| 0.211 | 0.515 | 0.088 | 1.147 | −1.053 | 0.088 | −0.959 | −0.148 | 0.088 |
| 0.262 | 0.478 | 0.088 | 1.107 | −1.004 | 0.088 | −1.013 | −0.180 | 0.088 |
| 0.312 | 0.438 | 0.088 | 1.066 | −0.956 | 0.088 | −1.067 | −0.214 | 0.088 |
| 0.359 | 0.397 | 0.088 | 1.026 | −0.908 | 0.088 | −1.120 | −0.248 | 0.088 |
| 0.405 | 0.353 | 0.088 | 0.985 | −0.860 | 0.088 | −1.174 | −0.281 | 0.088 |
| 0.449 | 0.308 | 0.088 | 0.943 | −0.812 | 0.088 | −1.232 | −0.303 | 0.088 |
| −1.252 | 0.091 | 0.10 | −0.173 | 0.686 | 0.10 | 1.022 | −0.550 | 0.10 |
| −1.218 | −0.282 | 0.10 | −0.089 | −0.026 | 0.10 | 0.910 | −0.777 | 0.10 |
| −1.305 | −0.217 | 0.10 | −0.488 | 0.693 | 0.10 | 0.731 | −0.060 | 0.10 |
| −1.274 | 0.032 | 0.10 | −0.299 | 0.703 | 0.10 | 1.194 | −1.116 | 0.10 |
| −1.194 | 0.203 | 0.10 | −0.028 | −0.046 | 0.10 | 0.952 | −0.824 | 0.10 |
| −1.106 | −0.225 | 0.10 | −0.464 | 0.019 | 0.10 | 0.783 | −0.636 | 0.10 |
| −1.309 | −0.154 | 0.10 | −0.337 | 0.019 | 0.10 | 1.142 | −0.773 | 0.10 |
| −1.159 | 0.257 | 0.10 | −0.112 | 0.670 | 0.10 | 1.201 | −0.884 | 0.10 |
| −1.279 | −0.273 | 0.10 | 0.031 | −0.068 | 0.10 | 0.649 | −0.501 | 0.10 |
| −1.305 | −0.091 | 0.10 | −0.274 | 0.013 | 0.10 | 0.993 | −0.872 | 0.10 |
| −1.122 | 0.308 | 0.10 | −0.425 | 0.701 | 0.10 | 1.172 | −0.829 | 0.10 |
| −1.292 | −0.029 | 0.10 | −0.236 | 0.697 | 0.10 | 0.866 | −0.275 | 0.10 |
| −1.160 | −0.258 | 0.10 | −0.400 | 0.021 | 0.10 | 1.115 | −1.018 | 0.10 |
| −1.225 | 0.148 | 0.10 | 0.372 | 0.380 | 0.10 | 0.800 | −0.167 | 0.10 |
| −0.589 | 0.004 | 0.10 | 0.411 | −0.294 | 0.10 | 1.112 | −0.717 | 0.10 |
| −0.841 | 0.560 | 0.10 | 0.255 | −0.185 | 0.10 | 1.052 | −0.606 | 0.10 |
| −0.772 | −0.047 | 0.10 | 0.557 | −0.415 | 0.10 | 0.868 | −0.729 | 0.10 |
| −0.944 | −0.126 | 0.10 | 0.089 | −0.094 | 0.10 | 0.898 | −0.329 | 0.10 |
| −0.611 | 0.664 | 0.10 | 0.583 | 0.145 | 0.10 | 0.696 | −0.008 | 0.10 |
| −1.082 | 0.356 | 0.10 | 0.325 | 0.423 | 0.10 | 0.833 | −0.221 | 0.10 |
| −0.999 | −0.157 | 0.10 | 0.509 | −0.373 | 0.10 | 1.155 | −1.067 | 0.10 |
| −0.944 | 0.487 | 0.10 | 0.461 | 0.290 | 0.10 | 1.075 | −0.969 | 0.10 |
| −0.712 | −0.026 | 0.10 | 0.360 | −0.256 | 0.10 | 0.659 | 0.044 | 0.10 |
| −1.038 | 0.402 | 0.10 | 0.277 | 0.463 | 0.10 | 0.991 | −0.495 | 0.10 |
| −0.786 | 0.591 | 0.10 | 0.603 | −0.458 | 0.10 | 0.766 | −0.113 | 0.10 |
| −0.651 | −0.009 | 0.10 | 0.201 | −0.153 | 0.10 | 0.826 | −0.683 | 0.10 |
| −0.671 | 0.644 | 0.10 | 0.503 | 0.243 | 0.10 | 0.694 | −0.545 | 0.10 |
| −0.831 | −0.070 | 0.10 | 0.064 | 0.600 | 0.10 | 0.960 | −0.439 | 0.10 |
| −0.550 | 0.681 | 0.10 | 0.226 | 0.501 | 0.10 | 0.739 | −0.591 | 0.10 |
| −0.992 | 0.446 | 0.10 | 0.174 | 0.537 | 0.10 | 1.349 | −1.164 | 0.10 |
| −0.527 | 0.014 | 0.10 | 0.460 | −0.333 | 0.10 | 1.369 | −1.277 | 0.10 |
| −0.894 | 0.525 | 0.10 | 0.622 | 0.095 | 0.10 | 1.234 | −1.165 | 0.10 |
| −0.729 | 0.619 | 0.10 | 0.417 | 0.336 | 0.10 | 1.261 | −0.996 | 0.10 |
| −1.053 | −0.190 | 0.10 | 0.145 | −0.122 | 0.10 | 1.379 | −1.220 | 0.10 |
| −0.888 | −0.096 | 0.10 | 0.120 | 0.570 | 0.10 | 1.313 | −1.264 | 0.10 |
| −0.052 | 0.651 | 0.10 | 0.308 | −0.220 | 0.10 | 1.369 | −1.277 | 0.10 |
| −0.362 | 0.704 | 0.10 | 0.544 | 0.194 | 0.10 | 1.231 | −0.940 | 0.10 |
| −0.150 | −0.009 | 0.10 | 1.082 | −0.661 | 0.10 | 1.319 | −1.108 | 0.10 |
| −0.212 | 0.004 | 0.10 | 0.929 | −0.384 | 0.10 | 1.274 | −1.214 | 0.10 |
| 0.007 | 0.627 | 0.10 | 1.034 | −0.921 | 0.10 | 1.290 | −1.052 | 0.10 |
| −1.170 | 0.232 | 0.20 | −0.258 | 0.126 | 0.20 | 0.794 | −0.651 | 0.20 |
| −1.139 | 0.284 | 0.20 | −0.378 | 0.143 | 0.20 | 1.167 | −0.912 | 0.20 |
| −1.246 | 0.004 | 0.20 | −0.446 | 0.717 | 0.20 | 1.204 | −1.175 | 0.20 |
| −1.236 | 0.063 | 0.20 | −0.199 | 0.112 | 0.20 | 0.690 | −0.070 | 0.20 |
| −1.219 | 0.122 | 0.20 | −0.084 | 0.074 | 0.20 | 1.195 | −0.966 | 0.20 |
| −1.196 | 0.178 | 0.20 | −0.317 | 0.136 | 0.20 | 0.833 | −0.697 | 0.20 |
| −1.165 | −0.125 | 0.20 | −0.265 | 0.711 | 0.20 | 0.909 | −0.791 | 0.20 |
| −1.222 | −0.111 | 0.20 | 0.021 | 0.616 | 0.20 | 0.755 | −0.604 | 0.20 |
| −1.246 | −0.057 | 0.20 | −0.498 | 0.143 | 0.20 | 0.908 | −0.433 | 0.20 |
| −1.107 | −0.108 | 0.20 | −0.147 | 0.685 | 0.20 | 1.020 | −0.935 | 0.20 |
| −0.941 | 0.511 | 0.20 | −0.205 | 0.701 | 0.20 | 0.755 | −0.172 | 0.20 |
| −0.791 | 0.070 | 0.20 | −0.385 | 0.720 | 0.20 | 0.967 | −0.539 | 0.20 |
| −1.003 | −0.045 | 0.20 | 0.398 | 0.316 | 0.20 | 0.848 | −0.328 | 0.20 |
| −0.737 | 0.641 | 0.20 | 0.466 | −0.295 | 0.20 | 1.110 | −0.806 | 0.20 |
| −0.618 | 0.126 | 0.20 | 0.552 | −0.380 | 0.20 | 0.657 | −0.020 | 0.20 |
| −0.681 | 0.665 | 0.20 | 0.268 | 0.443 | 0.20 | 1.130 | −1.079 | 0.20 |
| −0.846 | 0.045 | 0.20 | 0.594 | −0.423 | 0.20 | 1.167 | −1.127 | 0.20 |
| −0.565 | 0.699 | 0.20 | 0.622 | 0.031 | 0.20 | 0.716 | −0.558 | 0.20 |
| −0.791 | 0.614 | 0.20 | 0.183 | −0.067 | 0.20 | 0.996 | −0.592 | 0.20 |
| −1.105 | 0.335 | 0.20 | 0.233 | −0.102 | 0.20 | 0.938 | −0.486 | 0.20 |

TABLE II-continued

| X | Y | Z' | X | Y | Z' | X | Y | Z' |
|---|---|---|---|---|---|---|---|---|
| −0.843 | 0.583 | 0.20 | 0.438 | 0.270 | 0.20 | 0.871 | −0.744 | 0.20 |
| −1.068 | 0.382 | 0.20 | 0.329 | −0.175 | 0.20 | 0.946 | −0.839 | 0.20 |
| −0.559 | 0.137 | 0.20 | 0.282 | −0.138 | 0.20 | 0.676 | −0.513 | 0.20 |
| −0.899 | 0.017 | 0.20 | 0.074 | 0.586 | 0.20 | 1.057 | −0.983 | 0.20 |
| −0.893 | 0.548 | 0.20 | 0.477 | 0.224 | 0.20 | 1.223 | −1.020 | 0.20 |
| −1.028 | 0.428 | 0.20 | 0.222 | 0.482 | 0.20 | 0.818 | −0.276 | 0.20 |
| −0.952 | −0.013 | 0.20 | 0.080 | −0.004 | 0.20 | 1.025 | −0.645 | 0.20 |
| −0.624 | 0.684 | 0.20 | 0.125 | 0.554 | 0.20 | 1.139 | −0.859 | 0.20 |
| −1.055 | −0.077 | 0.20 | 0.515 | 0.177 | 0.20 | 0.723 | −0.121 | 0.20 |
| −0.986 | 0.471 | 0.20 | 0.376 | −0.214 | 0.20 | 1.082 | −0.752 | 0.20 |
| −0.734 | 0.092 | 0.20 | 0.635 | −0.468 | 0.20 | 0.787 | −0.224 | 0.20 |
| −0.677 | 0.111 | 0.20 | 0.552 | 0.129 | 0.20 | 1.053 | −0.699 | 0.20 |
| −0.325 | 0.718 | 0.20 | 0.174 | 0.519 | 0.20 | 0.983 | −0.887 | 0.20 |
| −0.141 | 0.095 | 0.20 | 0.313 | 0.402 | 0.20 | 0.878 | −0.381 | 0.20 |
| −0.506 | 0.710 | 0.20 | 0.132 | −0.035 | 0.20 | 1.294 | −1.234 | 0.20 |
| 0.027 | 0.025 | 0.20 | 0.356 | 0.359 | 0.20 | 1.251 | −1.074 | 0.20 |
| −0.089 | 0.666 | 0.20 | 0.509 | −0.337 | 0.20 | 1.307 | −1.181 | 0.20 |
| −0.033 | 0.643 | 0.20 | 0.421 | −0.254 | 0.20 | 1.240 | −1.224 | 0.20 |
| −0.438 | 0.145 | 0.20 | 0.588 | 0.080 | 0.20 | 1.294 | −1.234 | 0.20 |
| −0.028 | 0.051 | 0.20 | 1.094 | −1.031 | 0.20 | 1.279 | −1.127 | 0.20 |
| −1.113 | 0.033 | 0.30 | −0.406 | 0.750 | 0.30 | 0.931 | −0.851 | 0.30 |
| −1.144 | 0.272 | 0.30 | −0.468 | 0.270 | 0.30 | 0.688 | −0.526 | 0.30 |
| −1.182 | 0.163 | 0.30 | −0.078 | 0.172 | 0.30 | 1.210 | −1.087 | 0.30 |
| −1.187 | 0.105 | 0.30 | −0.070 | 0.669 | 0.30 | 1.033 | −0.992 | 0.30 |
| −1.118 | 0.324 | 0.30 | −0.295 | 0.251 | 0.30 | 1.077 | −0.829 | 0.30 |
| −1.166 | 0.219 | 0.30 | −0.234 | 0.728 | 0.30 | 0.897 | −0.804 | 0.30 |
| −1.166 | 0.053 | 0.30 | −0.130 | 0.197 | 0.30 | 1.134 | −1.133 | 0.30 |
| −1.054 | 0.421 | 0.30 | −0.239 | 0.236 | 0.30 | 0.652 | −0.480 | 0.30 |
| −0.793 | 0.648 | 0.30 | 0.031 | 0.612 | 0.30 | 0.759 | −0.617 | 0.30 |
| −1.017 | 0.465 | 0.30 | −0.410 | 0.268 | 0.30 | 0.999 | −0.945 | 0.30 |
| −0.803 | 0.185 | 0.30 | −0.184 | 0.218 | 0.30 | 0.648 | −0.072 | 0.30 |
| −1.005 | 0.071 | 0.30 | 0.300 | −0.095 | 0.30 | 1.168 | −1.180 | 0.30 |
| −0.695 | 0.229 | 0.30 | 0.126 | 0.545 | 0.30 | 0.968 | −0.624 | 0.30 |
| −0.742 | 0.676 | 0.30 | 0.584 | 0.025 | 0.30 | 1.157 | −0.984 | 0.30 |
| −0.977 | 0.507 | 0.30 | 0.337 | 0.346 | 0.30 | 0.679 | −0.121 | 0.30 |
| −0.854 | 0.158 | 0.30 | 0.464 | −0.259 | 0.30 | 0.884 | −0.472 | 0.30 |
| −0.526 | 0.267 | 0.30 | 0.424 | −0.217 | 0.30 | 1.184 | −1.035 | 0.30 |
| −0.583 | 0.259 | 0.30 | 0.616 | −0.435 | 0.30 | 0.798 | −0.320 | 0.30 |
| −0.689 | 0.699 | 0.30 | 0.551 | 0.073 | 0.30 | 0.828 | −0.710 | 0.30 |
| −0.935 | 0.547 | 0.30 | 0.616 | −0.024 | 0.30 | 1.221 | −1.189 | 0.30 |
| −0.904 | 0.129 | 0.30 | 0.375 | 0.303 | 0.30 | 0.965 | −0.898 | 0.30 |
| −0.640 | 0.246 | 0.30 | 0.079 | 0.580 | 0.30 | 1.104 | −0.881 | 0.30 |
| −0.635 | 0.719 | 0.30 | 0.171 | 0.509 | 0.30 | 0.995 | −0.675 | 0.30 |
| −0.843 | 0.618 | 0.30 | 0.383 | −0.176 | 0.30 | 0.709 | −0.171 | 0.30 |
| −0.890 | 0.584 | 0.30 | 0.256 | −0.057 | 0.30 | 0.863 | −0.757 | 0.30 |
| −1.057 | 0.045 | 0.30 | 0.579 | −0.390 | 0.30 | 0.794 | −0.664 | 0.30 |
| −0.954 | 0.100 | 0.30 | 0.518 | 0.120 | 0.30 | 0.940 | −0.573 | 0.30 |
| −1.088 | 0.373 | 0.30 | 0.483 | 0.167 | 0.30 | 1.022 | −0.727 | 0.30 |
| −0.750 | 0.209 | 0.30 | 0.412 | 0.258 | 0.30 | 0.739 | −0.220 | 0.30 |
| −0.578 | 0.733 | 0.30 | 0.448 | 0.213 | 0.30 | 1.130 | −0.932 | 0.30 |
| −0.290 | 0.739 | 0.30 | 0.503 | −0.302 | 0.30 | 0.827 | −0.371 | 0.30 |
| 0.024 | 0.116 | 0.30 | 0.297 | 0.389 | 0.30 | 1.100 | −1.086 | 0.30 |
| −0.464 | 0.749 | 0.30 | 0.215 | 0.470 | 0.30 | 1.066 | −1.039 | 0.30 |
| −0.019 | 0.642 | 0.30 | 0.120 | 0.052 | 0.30 | 0.856 | −0.421 | 0.30 |
| −0.352 | 0.262 | 0.30 | 0.342 | −0.135 | 0.30 | 1.050 | −0.778 | 0.30 |
| −0.026 | 0.146 | 0.30 | 0.212 | −0.019 | 0.30 | 0.724 | −0.571 | 0.30 |
| −0.123 | 0.692 | 0.30 | 0.541 | −0.346 | 0.30 | 1.221 | −1.189 | 0.30 |
| −0.348 | 0.747 | 0.30 | 0.167 | 0.017 | 0.30 | 0.769 | −0.270 | 0.30 |
| −0.521 | 0.744 | 0.30 | 0.257 | 0.430 | 0.30 | 0.912 | −0.522 | 0.30 |
| −0.178 | 0.712 | 0.30 | 0.073 | 0.085 | 0.30 | 1.237 | −1.138 | 0.30 |
| −1.118 | 0.333 | 0.40 | −0.332 | 0.374 | 0.40 | 0.279 | 0.385 | 0.40 |
| −1.116 | 0.226 | 0.40 | −0.278 | 0.359 | 0.40 | 0.449 | 0.166 | 0.40 |
| −1.130 | 0.279 | 0.40 | −0.497 | 0.391 | 0.40 | 0.603 | −0.066 | 0.40 |
| −0.742 | 0.725 | 0.40 | −0.203 | 0.751 | 0.40 | 0.881 | −0.547 | 0.40 |
| −0.607 | 0.378 | 0.40 | −0.310 | 0.781 | 0.40 | 1.011 | −0.792 | 0.40 |
| −1.070 | 0.433 | 0.40 | −0.226 | 0.340 | 0.40 | 0.967 | −0.948 | 0.40 |
| −0.913 | 0.248 | 0.40 | 0.016 | 0.204 | 0.40 | 1.138 | −1.039 | 0.40 |
| −0.966 | 0.563 | 0.40 | −0.053 | 0.679 | 0.40 | 0.651 | −0.490 | 0.40 |
| −0.883 | 0.637 | 0.40 | −0.386 | 0.384 | 0.40 | 0.905 | −0.856 | 0.40 |
| −0.531 | 0.791 | 0.40 | −0.152 | 0.730 | 0.40 | 0.717 | −0.256 | 0.40 |
| −0.838 | 0.670 | 0.40 | −0.175 | 0.318 | 0.40 | 0.986 | −0.743 | 0.40 |
| −0.692 | 0.748 | 0.40 | 0.226 | 0.023 | 0.40 | 0.999 | −0.993 | 0.40 |
| −0.661 | 0.364 | 0.40 | 0.484 | −0.268 | 0.40 | 1.113 | −0.990 | 0.40 |
| −0.864 | 0.275 | 0.40 | 0.304 | −0.057 | 0.40 | 0.874 | −0.810 | 0.40 |
| −0.586 | 0.781 | 0.40 | 0.103 | 0.135 | 0.40 | 0.684 | −0.536 | 0.40 |
| −1.039 | 0.479 | 0.40 | 0.242 | 0.427 | 0.40 | 0.854 | −0.498 | 0.40 |
| −0.815 | 0.300 | 0.40 | 0.417 | 0.211 | 0.40 | 0.689 | −0.208 | 0.40 |

TABLE II-continued

| X | Y | Z' | X | Y | Z' | X | Y | Z' |
|---|---|---|---|---|---|---|---|---|
| −1.070 | 0.198 | 0.40 | 0.573 | −0.019 | 0.40 | 0.960 | −0.694 | 0.40 |
| −0.639 | 0.767 | 0.40 | 0.519 | −0.312 | 0.40 | 1.030 | −1.039 | 0.40 |
| −1.097 | 0.384 | 0.40 | 0.341 | −0.098 | 0.40 | 0.716 | −0.581 | 0.40 |
| −0.552 | 0.387 | 0.40 | 0.204 | 0.467 | 0.40 | 0.827 | −0.449 | 0.40 |
| −0.765 | 0.324 | 0.40 | 0.383 | 0.256 | 0.40 | 1.088 | −0.940 | 0.40 |
| −1.015 | 0.203 | 0.40 | 0.543 | 0.028 | 0.40 | 0.661 | −0.161 | 0.40 |
| −0.791 | 0.699 | 0.40 | 0.186 | 0.061 | 0.40 | 0.800 | −0.401 | 0.40 |
| −0.714 | 0.346 | 0.40 | 0.165 | 0.507 | 0.40 | 0.934 | −0.645 | 0.40 |
| −1.004 | 0.522 | 0.40 | 0.552 | −0.356 | 0.40 | 1.062 | −1.085 | 0.40 |
| −0.926 | 0.601 | 0.40 | 0.349 | 0.299 | 0.40 | 1.145 | −1.138 | 0.40 |
| −0.963 | 0.224 | 0.40 | 0.512 | 0.074 | 0.40 | 0.748 | −0.626 | 0.40 |
| −0.441 | 0.390 | 0.40 | 0.378 | −0.140 | 0.40 | 1.094 | −1.130 | 0.40 |
| −0.476 | 0.796 | 0.40 | 0.586 | −0.401 | 0.40 | 0.773 | −0.353 | 0.40 |
| −0.039 | 0.616 | 0.40 | 0.414 | −0.182 | 0.40 | 0.907 | −0.596 | 0.40 |
| −0.125 | 0.293 | 0.40 | 0.124 | 0.545 | 0.40 | 1.063 | −0.891 | 0.40 |
| −0.420 | 0.796 | 0.40 | 0.314 | 0.343 | 0.40 | 1.037 | −0.842 | 0.40 |
| −0.030 | 0.235 | 0.40 | 0.481 | 0.120 | 0.40 | 0.936 | −0.902 | 0.40 |
| −0.256 | 0.768 | 0.40 | 0.145 | 0.099 | 0.40 | 1.163 | −1.089 | 0.40 |
| 0.060 | 0.170 | 0.40 | 0.632 | −0.113 | 0.40 | 0.779 | −0.672 | 0.40 |
| −0.102 | 0.706 | 0.40 | 0.619 | −0.445 | 0.40 | 1.145 | −1.138 | 0.40 |
| −0.006 | 0.649 | 0.40 | 0.265 | −0.017 | 0.40 | 0.811 | −0.718 | 0.40 |
| −0.365 | 0.791 | 0.40 | 0.082 | 0.582 | 0.40 | 0.842 | −0.764 | 0.40 |
| −0.077 | 0.265 | 0.40 | 0.450 | −0.225 | 0.40 | 0.745 | −0.304 | 0.40 |
| −0.783 | 0.446 | 0.50 | −0.368 | 0.494 | 0.50 | 0.326 | −0.061 | 0.50 |
| −0.992 | 0.603 | 0.50 | −0.429 | 0.853 | 0.50 | 0.153 | 0.141 | 0.50 |
| −0.786 | 0.769 | 0.50 | −0.175 | 0.780 | 0.50 | 0.352 | 0.263 | 0.50 |
| −0.734 | 0.466 | 0.50 | −0.083 | 0.726 | 0.50 | 0.154 | 0.514 | 0.50 |
| −0.535 | 0.851 | 0.50 | −0.084 | 0.354 | 0.50 | 0.289 | 0.349 | 0.50 |
| −0.981 | 0.371 | 0.50 | −0.317 | 0.479 | 0.50 | 0.637 | −0.186 | 0.50 |
| −1.025 | 0.561 | 0.50 | −0.482 | 0.855 | 0.50 | 0.499 | 0.041 | 0.50 |
| −0.832 | 0.742 | 0.50 | −0.041 | 0.322 | 0.50 | 0.956 | −0.984 | 0.50 |
| −0.587 | 0.842 | 0.50 | −0.267 | 0.460 | 0.50 | 1.015 | −0.889 | 0.50 |
| −0.683 | 0.483 | 0.50 | 0.042 | 0.627 | 0.50 | 0.810 | −0.761 | 0.50 |
| −0.579 | 0.506 | 0.50 | 0.118 | 0.553 | 0.50 | 0.767 | −0.418 | 0.50 |
| −0.930 | 0.384 | 0.50 | 0.359 | −0.103 | 0.50 | 1.065 | −1.077 | 0.50 |
| −1.052 | 0.515 | 0.50 | 0.189 | 0.101 | 0.50 | 0.665 | −0.539 | 0.50 |
| −0.876 | 0.711 | 0.50 | 0.470 | 0.086 | 0.50 | 0.818 | −0.511 | 0.50 |
| −0.639 | 0.830 | 0.50 | 0.321 | 0.306 | 0.50 | 0.843 | −0.558 | 0.50 |
| −0.880 | 0.404 | 0.50 | 0.610 | −0.140 | 0.50 | 0.742 | −0.371 | 0.50 |
| −1.072 | 0.466 | 0.50 | 0.555 | −0.049 | 0.50 | 0.868 | −0.605 | 0.50 |
| −0.917 | 0.678 | 0.50 | 0.441 | 0.131 | 0.50 | 0.985 | −1.028 | 0.50 |
| −0.690 | 0.813 | 0.50 | 0.412 | 0.175 | 0.50 | 0.991 | −0.841 | 0.50 |
| −0.832 | 0.425 | 0.50 | 0.391 | −0.146 | 0.50 | 0.839 | −0.806 | 0.50 |
| −1.071 | 0.414 | 0.50 | 0.224 | 0.062 | 0.50 | 0.694 | −0.583 | 0.50 |
| −0.739 | 0.793 | 0.50 | 0.582 | −0.095 | 0.50 | 0.716 | −0.325 | 0.50 |
| −0.632 | 0.497 | 0.50 | 0.293 | −0.020 | 0.50 | 1.016 | −1.071 | 0.50 |
| −0.956 | 0.642 | 0.50 | 0.576 | −0.406 | 0.50 | 0.967 | −0.794 | 0.50 |
| −0.526 | 0.511 | 0.50 | 0.423 | −0.188 | 0.50 | 0.781 | −0.717 | 0.50 |
| −1.034 | 0.377 | 0.50 | 0.259 | 0.021 | 0.50 | 0.868 | −0.851 | 0.50 |
| −0.128 | 0.754 | 0.50 | 0.079 | 0.216 | 0.50 | 0.723 | −0.628 | 0.50 |
| −0.273 | 0.821 | 0.50 | 0.257 | 0.391 | 0.50 | 0.690 | −0.279 | 0.50 |
| 0.002 | 0.662 | 0.50 | 0.606 | −0.450 | 0.50 | 1.065 | −1.077 | 0.50 |
| 0.000 | 0.288 | 0.50 | 0.455 | −0.231 | 0.50 | 0.943 | −0.746 | 0.50 |
| −0.219 | 0.438 | 0.50 | 0.116 | 0.179 | 0.50 | 0.898 | −0.895 | 0.50 |
| −0.473 | 0.510 | 0.50 | 0.223 | 0.433 | 0.50 | 1.063 | −0.984 | 0.50 |
| −0.324 | 0.836 | 0.50 | 0.382 | 0.219 | 0.50 | 0.752 | −0.672 | 0.50 |
| −0.223 | 0.802 | 0.50 | 0.527 | −0.004 | 0.50 | 0.893 | −0.652 | 0.50 |
| 0.040 | 0.253 | 0.50 | 0.516 | −0.318 | 0.50 | 1.085 | −1.032 | 0.50 |
| −0.173 | 0.412 | 0.50 | 0.081 | 0.591 | 0.50 | 0.663 | −0.232 | 0.50 |
| −0.420 | 0.505 | 0.50 | 0.546 | −0.362 | 0.50 | 0.793 | −0.465 | 0.50 |
| −0.040 | 0.695 | 0.50 | 0.635 | −0.494 | 0.50 | 0.918 | −0.699 | 0.50 |
| −0.376 | 0.847 | 0.50 | 0.189 | 0.474 | 0.50 | 0.927 | −0.940 | 0.50 |
| −0.127 | 0.384 | 0.50 | 0.486 | −0.275 | 0.50 | 1.039 | −0.937 | 0.50 |
| −0.849 | 0.572 | 0.60 | −0.259 | 0.562 | 0.60 | 0.638 | −0.236 | 0.60 |
| −0.603 | 0.635 | 0.60 | −0.056 | 0.411 | 0.60 | 0.406 | 0.159 | 0.60 |
| −0.728 | 0.885 | 0.60 | 0.046 | 0.651 | 0.60 | 0.379 | 0.202 | 0.60 |
| −0.530 | 0.929 | 0.60 | −0.146 | 0.817 | 0.60 | 0.237 | 0.413 | 0.60 |
| −0.680 | 0.902 | 0.60 | −0.401 | 0.619 | 0.60 | 0.086 | 0.264 | 0.60 |
| −0.976 | 0.712 | 0.60 | −0.378 | 0.918 | 0.60 | 0.080 | 0.614 | 0.60 |
| −0.898 | 0.559 | 0.60 | −0.305 | 0.585 | 0.60 | 0.245 | 0.066 | 0.60 |
| −0.653 | 0.627 | 0.60 | −0.094 | 0.445 | 0.60 | 0.324 | 0.288 | 0.60 |
| −0.942 | 0.750 | 0.60 | −0.105 | 0.788 | 0.60 | 0.392 | −0.142 | 0.60 |
| −0.949 | 0.556 | 0.60 | −0.329 | 0.906 | 0.60 | 0.532 | −0.355 | 0.60 |
| −0.703 | 0.616 | 0.60 | 0.538 | −0.059 | 0.60 | 0.783 | −0.505 | 0.60 |
| −0.775 | 0.865 | 0.60 | 0.563 | −0.103 | 0.60 | 0.662 | −0.281 | 0.60 |
| −0.904 | 0.784 | 0.60 | 0.266 | 0.372 | 0.60 | 0.640 | −0.527 | 0.60 |
| −0.994 | 0.576 | 0.60 | 0.113 | 0.575 | 0.60 | 0.990 | −1.003 | 0.60 |

TABLE II-continued

| X | Y | Z' | X | Y | Z' | X | Y | Z' |
|---|---|---|---|---|---|---|---|---|
| −0.752 | 0.602 | 0.60 | 0.214 | 0.106 | 0.60 | 0.776 | −0.743 | 0.60 |
| −0.501 | 0.636 | 0.60 | 0.363 | −0.100 | 0.60 | 0.923 | −0.776 | 0.60 |
| −0.631 | 0.914 | 0.60 | 0.504 | −0.312 | 0.60 | 0.912 | −0.957 | 0.60 |
| −0.863 | 0.814 | 0.60 | 0.433 | 0.116 | 0.60 | 0.807 | −0.550 | 0.60 |
| −1.016 | 0.620 | 0.60 | 0.295 | 0.330 | 0.60 | 0.721 | −0.657 | 0.60 |
| −0.800 | 0.587 | 0.60 | 0.146 | 0.536 | 0.60 | 0.687 | −0.325 | 0.60 |
| −0.552 | 0.638 | 0.60 | 0.183 | 0.146 | 0.60 | 0.748 | −0.700 | 0.60 |
| −0.581 | 0.924 | 0.60 | 0.334 | −0.058 | 0.60 | 0.946 | −0.822 | 0.60 |
| −0.820 | 0.841 | 0.60 | 0.613 | −0.484 | 0.60 | 0.885 | −0.914 | 0.60 |
| −1.003 | 0.669 | 0.60 | 0.512 | −0.015 | 0.60 | 0.830 | −0.595 | 0.60 |
| −0.352 | 0.604 | 0.60 | 0.588 | −0.147 | 0.60 | 0.711 | −0.370 | 0.60 |
| −0.133 | 0.477 | 0.60 | 0.460 | 0.073 | 0.60 | 0.968 | −0.868 | 0.60 |
| 0.052 | 0.302 | 0.60 | 0.177 | 0.495 | 0.60 | 0.858 | −0.871 | 0.60 |
| −0.065 | 0.756 | 0.60 | 0.151 | 0.186 | 0.60 | 0.854 | −0.640 | 0.60 |
| −0.281 | 0.889 | 0.60 | 0.305 | −0.017 | 0.60 | 0.735 | −0.415 | 0.60 |
| −0.173 | 0.508 | 0.60 | 0.449 | −0.227 | 0.60 | 0.694 | −0.613 | 0.60 |
| 0.017 | 0.339 | 0.60 | 0.586 | −0.441 | 0.60 | 0.991 | −0.913 | 0.60 |
| −0.027 | 0.723 | 0.60 | 0.613 | −0.192 | 0.60 | 0.830 | −0.828 | 0.60 |
| −0.234 | 0.868 | 0.60 | 0.486 | 0.029 | 0.60 | 0.877 | −0.685 | 0.60 |
| −0.479 | 0.930 | 0.60 | 0.352 | 0.245 | 0.60 | 0.990 | −1.003 | 0.60 |
| −0.450 | 0.630 | 0.60 | 0.477 | −0.269 | 0.60 | 0.759 | −0.460 | 0.60 |
| −0.216 | 0.536 | 0.60 | 0.207 | 0.455 | 0.60 | 0.667 | −0.570 | 0.60 |
| −0.019 | 0.375 | 0.60 | 0.119 | 0.225 | 0.60 | 1.011 | −0.960 | 0.60 |
| 0.010 | 0.688 | 0.60 | 0.275 | 0.025 | 0.60 | 0.803 | −0.785 | 0.60 |
| −0.190 | 0.844 | 0.60 | 0.421 | −0.184 | 0.60 | 0.900 | −0.731 | 0.60 |
| −0.429 | 0.926 | 0.60 | 0.559 | −0.398 | 0.60 | 0.943 | −0.998 | 0.60 |
| −0.793 | 0.755 | 0.70 | −0.065 | 0.465 | 0.70 | 0.372 | 0.187 | 0.70 |
| −0.613 | 1.015 | 0.70 | −0.051 | 0.777 | 0.70 | 0.231 | 0.081 | 0.70 |
| −0.844 | 0.948 | 0.70 | −0.241 | 0.928 | 0.70 | 0.244 | 0.393 | 0.70 |
| −0.599 | 0.768 | 0.70 | −0.468 | 1.010 | 0.70 | 0.364 | −0.122 | 0.70 |
| −0.503 | 0.755 | 0.70 | −0.282 | 0.658 | 0.70 | 0.106 | 0.593 | 0.70 |
| −0.841 | 0.748 | 0.70 | −0.098 | 0.500 | 0.70 | 0.544 | −0.411 | 0.70 |
| −0.565 | 1.017 | 0.70 | 0.060 | 0.316 | 0.70 | 0.620 | −0.535 | 0.70 |
| −0.889 | 0.747 | 0.70 | −0.018 | 0.742 | 0.70 | 0.633 | −0.279 | 0.70 |
| −0.801 | 0.970 | 0.70 | −0.200 | 0.902 | 0.70 | 0.517 | −0.066 | 0.70 |
| −0.648 | 0.769 | 0.70 | −0.420 | 1.000 | 0.70 | 0.397 | 0.145 | 0.70 |
| −0.959 | 0.803 | 0.70 | −0.205 | 0.600 | 0.70 | 0.203 | 0.121 | 0.70 |
| −0.516 | 1.015 | 0.70 | −0.323 | 0.684 | 0.70 | 0.270 | 0.352 | 0.70 |
| −0.934 | 0.763 | 0.70 | 0.541 | −0.108 | 0.70 | 0.338 | −0.081 | 0.70 |
| −0.756 | 0.987 | 0.70 | 0.422 | 0.104 | 0.70 | 0.135 | 0.554 | 0.70 |
| −0.696 | 0.766 | 0.70 | 0.175 | 0.160 | 0.70 | 0.467 | −0.287 | 0.70 |
| −0.949 | 0.850 | 0.70 | 0.296 | 0.311 | 0.70 | 0.594 | −0.494 | 0.70 |
| −0.959 | 0.803 | 0.70 | 0.312 | −0.041 | 0.70 | 0.697 | −0.659 | 0.70 |
| −0.709 | 1.000 | 0.70 | 0.163 | 0.514 | 0.70 | 0.826 | −0.864 | 0.70 |
| −0.745 | 0.761 | 0.70 | 0.442 | −0.246 | 0.70 | 0.896 | −0.799 | 0.70 |
| −0.921 | 0.890 | 0.70 | 0.569 | −0.452 | 0.70 | 0.789 | −0.581 | 0.70 |
| −0.661 | 1.010 | 0.70 | 0.564 | −0.151 | 0.70 | 0.678 | −0.365 | 0.70 |
| −0.885 | 0.922 | 0.70 | 0.446 | 0.061 | 0.70 | 0.671 | −0.617 | 0.70 |
| −0.551 | 0.764 | 0.70 | 0.147 | 0.200 | 0.70 | 0.801 | −0.823 | 0.70 |
| −0.132 | 0.535 | 0.70 | 0.322 | 0.270 | 0.70 | 0.917 | −0.842 | 0.70 |
| 0.030 | 0.354 | 0.70 | 0.285 | 0.000 | 0.70 | 0.811 | −0.624 | 0.70 |
| −0.168 | 0.568 | 0.70 | 0.190 | 0.474 | 0.70 | 0.701 | −0.408 | 0.70 |
| 0.015 | 0.706 | 0.70 | 0.416 | −0.204 | 0.70 | 0.645 | −0.576 | 0.70 |
| −0.160 | 0.874 | 0.70 | 0.493 | −0.328 | 0.70 | 0.775 | −0.782 | 0.70 |
| −0.374 | 0.988 | 0.70 | 0.587 | −0.193 | 0.70 | 0.929 | −0.888 | 0.70 |
| −0.366 | 0.706 | 0.70 | 0.470 | 0.019 | 0.70 | 0.832 | −0.668 | 0.70 |
| −0.001 | 0.392 | 0.70 | 0.118 | 0.239 | 0.70 | 0.723 | −0.451 | 0.70 |
| 0.046 | 0.669 | 0.70 | 0.347 | 0.229 | 0.70 | 0.749 | −0.740 | 0.70 |
| −0.123 | 0.843 | 0.70 | 0.258 | 0.040 | 0.70 | 0.897 | −0.921 | 0.70 |
| −0.328 | 0.971 | 0.70 | 0.217 | 0.434 | 0.70 | 0.854 | −0.711 | 0.70 |
| −0.243 | 0.630 | 0.70 | 0.390 | −0.163 | 0.70 | 0.745 | −0.494 | 0.70 |
| −0.033 | 0.429 | 0.70 | 0.076 | 0.631 | 0.70 | 0.723 | −0.700 | 0.70 |
| −0.411 | 0.726 | 0.70 | 0.518 | −0.370 | 0.70 | 0.854 | −0.904 | 0.70 |
| −0.086 | 0.811 | 0.70 | 0.610 | −0.236 | 0.70 | 0.875 | −0.755 | 0.70 |
| −0.284 | 0.951 | 0.70 | 0.494 | −0.023 | 0.70 | 0.767 | −0.537 | 0.70 |
| −0.456 | 0.742 | 0.70 | 0.089 | 0.278 | 0.70 | 0.656 | −0.322 | 0.70 |
| −0.713 | 1.119 | 0.80 | −0.186 | 0.641 | 0.80 | 0.199 | 0.111 | 0.80 |
| −0.888 | 0.951 | 0.80 | −0.361 | 0.796 | 0.80 | 0.255 | 0.356 | 0.80 |
| −0.758 | 1.109 | 0.80 | −0.392 | 1.075 | 0.80 | 0.371 | 0.154 | 0.80 |
| −0.526 | 1.116 | 0.80 | −0.194 | 0.952 | 0.80 | 0.273 | −0.008 | 0.80 |
| −0.711 | 0.914 | 0.80 | −0.032 | 0.784 | 0.80 | 0.148 | 0.190 | 0.80 |
| −0.618 | 0.905 | 0.80 | −0.010 | 0.423 | 0.80 | 0.483 | −0.052 | 0.80 |
| −0.850 | 0.925 | 0.80 | −0.154 | 0.606 | 0.80 | 0.592 | −0.259 | 0.80 |
| −0.802 | 1.093 | 0.80 | −0.323 | 0.768 | 0.80 | 0.613 | −0.568 | 0.80 |
| −0.573 | 1.123 | 0.80 | −0.025 | 0.710 | 0.80 | 0.491 | −0.368 | 0.80 |
| −0.572 | 0.895 | 0.80 | −0.436 | 1.092 | 0.80 | 0.371 | −0.168 | 0.80 |
| −0.804 | 0.918 | 0.80 | −0.231 | 0.981 | 0.80 | 0.123 | 0.230 | 0.80 |

TABLE II-continued

| X | Y | Z' | X | Y | Z' | X | Y | Z' |
|---|---|---|---|---|---|---|---|---|
| −0.843 | 1.070 | 0.80 | −0.062 | 0.820 | 0.80 | 0.106 | 0.595 | 0.80 |
| −0.619 | 1.126 | 0.80 | 0.206 | 0.437 | 0.80 | 0.231 | 0.397 | 0.80 |
| −0.527 | 0.881 | 0.80 | 0.325 | 0.235 | 0.80 | 0.322 | −0.088 | 0.80 |
| −0.757 | 0.916 | 0.80 | 0.097 | 0.269 | 0.80 | 0.348 | 0.194 | 0.80 |
| −0.877 | 1.038 | 0.80 | 0.439 | 0.031 | 0.80 | 0.461 | −0.011 | 0.80 |
| −0.664 | 0.911 | 0.80 | 0.549 | −0.176 | 0.80 | 0.571 | −0.218 | 0.80 |
| −0.666 | 1.125 | 0.80 | 0.539 | −0.449 | 0.80 | 0.249 | 0.032 | 0.80 |
| −0.897 | 0.996 | 0.80 | 0.419 | −0.248 | 0.80 | 0.637 | −0.608 | 0.80 |
| 0.053 | 0.672 | 0.80 | 0.298 | −0.048 | 0.80 | 0.515 | −0.409 | 0.80 |
| 0.018 | 0.385 | 0.80 | 0.182 | 0.476 | 0.80 | 0.395 | −0.208 | 0.80 |
| −0.124 | 0.571 | 0.80 | 0.302 | 0.276 | 0.80 | 0.656 | −0.384 | 0.80 |
| −0.287 | 0.739 | 0.80 | 0.417 | 0.072 | 0.80 | 0.759 | −0.594 | 0.80 |
| −0.483 | 0.864 | 0.80 | 0.224 | 0.072 | 0.80 | 0.662 | −0.648 | 0.80 |
| −0.481 | 1.105 | 0.80 | 0.527 | −0.135 | 0.80 | 0.856 | −0.807 | 0.80 |
| −0.269 | 1.008 | 0.80 | 0.635 | −0.343 | 0.80 | 0.835 | −0.846 | 0.80 |
| −0.093 | 0.855 | 0.80 | 0.174 | 0.151 | 0.80 | 0.739 | −0.552 | 0.80 |
| −0.045 | 0.346 | 0.80 | 0.564 | −0.489 | 0.80 | 0.687 | −0.687 | 0.80 |
| −0.094 | 0.534 | 0.80 | 0.443 | −0.288 | 0.80 | 0.840 | −0.764 | 0.80 |
| −0.252 | 0.708 | 0.80 | 0.071 | 0.307 | 0.80 | 0.719 | −0.510 | 0.80 |
| −0.441 | 0.844 | 0.80 | 0.157 | 0.516 | 0.80 | 0.712 | −0.727 | 0.80 |
| −0.309 | 1.033 | 0.80 | 0.278 | 0.316 | 0.80 | 0.820 | −0.721 | 0.80 |
| −0.125 | 0.889 | 0.80 | 0.394 | 0.113 | 0.80 | 0.698 | −0.468 | 0.80 |
| −0.066 | 0.498 | 0.80 | 0.080 | 0.633 | 0.80 | 0.736 | −0.767 | 0.80 |
| −0.159 | 0.921 | 0.80 | 0.505 | −0.093 | 0.80 | 0.800 | −0.679 | 0.80 |
| −0.218 | 0.675 | 0.80 | 0.614 | −0.301 | 0.80 | 0.791 | −0.843 | 0.80 |
| −0.400 | 0.821 | 0.80 | 0.588 | −0.529 | 0.80 | 0.677 | −0.426 | 0.80 |
| −0.350 | 1.055 | 0.80 | 0.467 | −0.328 | 0.80 | 0.761 | −0.807 | 0.80 |
| −0.003 | 0.747 | 0.80 | 0.346 | −0.128 | 0.80 | 0.780 | −0.637 | 0.80 |
| −0.037 | 0.460 | 0.80 | 0.132 | 0.555 | 0.80 | 0.835 | −0.846 | 0.80 |
| −0.508 | 1.226 | 0.90 | 0.022 | 0.358 | 0.90 | 0.604 | −0.336 | 0.90 |
| −0.705 | 1.070 | 0.90 | −0.068 | 0.845 | 0.90 | 0.504 | −0.133 | 0.90 |
| −0.730 | 1.251 | 0.90 | −0.215 | 1.017 | 0.90 | 0.401 | 0.069 | 0.90 |
| −0.498 | 0.981 | 0.90 | −0.388 | 1.164 | 0.90 | 0.294 | 0.269 | 0.90 |
| −0.749 | 1.080 | 0.90 | −0.425 | 0.927 | 0.90 | 0.142 | 0.166 | 0.90 |
| −0.685 | 1.257 | 0.90 | −0.267 | 0.764 | 0.90 | 0.181 | 0.466 | 0.90 |
| −0.536 | 1.005 | 0.90 | −0.129 | 0.584 | 0.90 | 0.259 | −0.028 | 0.90 |
| −0.792 | 1.093 | 0.90 | −0.003 | 0.396 | 0.90 | 0.062 | 0.659 | 0.90 |
| −0.640 | 1.257 | 0.90 | −0.041 | 0.808 | 0.90 | 0.376 | −0.223 | 0.90 |
| −0.576 | 1.026 | 0.90 | −0.184 | 0.984 | 0.90 | 0.493 | −0.417 | 0.90 |
| −0.830 | 1.168 | 0.90 | −0.350 | 1.138 | 0.90 | 0.614 | −0.609 | 0.90 |
| −0.825 | 1.124 | 0.90 | −0.461 | 0.955 | 0.90 | 0.624 | −0.377 | 0.90 |
| −0.595 | 1.252 | 0.90 | −0.297 | 0.798 | 0.90 | 0.524 | −0.173 | 0.90 |
| −0.618 | 1.043 | 0.90 | −0.156 | 0.621 | 0.90 | 0.422 | 0.029 | 0.90 |
| −0.808 | 1.207 | 0.90 | −0.028 | 0.434 | 0.90 | 0.315 | 0.229 | 0.90 |
| −0.830 | 1.168 | 0.90 | 0.213 | 0.049 | 0.90 | 0.118 | 0.204 | 0.90 |
| −0.551 | 1.241 | 0.90 | 0.111 | 0.582 | 0.90 | 0.204 | 0.427 | 0.90 |
| −0.661 | 1.058 | 0.90 | 0.329 | −0.145 | 0.90 | 0.236 | 0.010 | 0.90 |
| −0.772 | 1.234 | 0.90 | 0.446 | −0.339 | 0.90 | 0.086 | 0.621 | 0.90 |
| −0.015 | 0.771 | 0.90 | 0.565 | −0.533 | 0.90 | 0.353 | −0.184 | 0.90 |
| −0.154 | 0.951 | 0.90 | 0.565 | −0.255 | 0.90 | 0.470 | −0.378 | 0.90 |
| −0.315 | 1.110 | 0.90 | 0.463 | −0.052 | 0.90 | 0.590 | −0.571 | 0.90 |
| −0.327 | 0.832 | 0.90 | 0.358 | 0.149 | 0.90 | 0.544 | −0.214 | 0.90 |
| −0.183 | 0.658 | 0.90 | 0.070 | 0.281 | 0.90 | 0.442 | −0.012 | 0.90 |
| −0.052 | 0.472 | 0.90 | 0.249 | 0.348 | 0.90 | 0.337 | 0.189 | 0.90 |
| 0.011 | 0.734 | 0.90 | 0.189 | 0.088 | 0.90 | 0.094 | 0.243 | 0.90 |
| −0.124 | 0.916 | 0.90 | 0.134 | 0.544 | 0.90 | 0.227 | 0.388 | 0.90 |
| −0.280 | 1.080 | 0.90 | 0.306 | −0.106 | 0.90 | 0.686 | −0.724 | 0.90 |
| −0.466 | 1.208 | 0.90 | 0.423 | −0.301 | 0.90 | 0.759 | −0.664 | 0.90 |
| −0.359 | 0.865 | 0.90 | 0.541 | −0.494 | 0.90 | 0.663 | −0.459 | 0.90 |
| −0.210 | 0.694 | 0.90 | 0.585 | −0.295 | 0.90 | 0.662 | −0.686 | 0.90 |
| −0.078 | 0.510 | 0.90 | 0.483 | −0.092 | 0.90 | 0.777 | −0.706 | 0.90 |
| 0.046 | 0.320 | 0.90 | 0.380 | 0.109 | 0.90 | 0.682 | −0.500 | 0.90 |
| 0.037 | 0.697 | 0.90 | 0.272 | 0.309 | 0.90 | 0.785 | −0.749 | 0.90 |
| −0.096 | 0.881 | 0.90 | 0.165 | 0.127 | 0.90 | 0.701 | −0.541 | 0.90 |
| −0.247 | 1.049 | 0.90 | 0.158 | 0.505 | 0.90 | 0.752 | −0.778 | 0.90 |
| −0.426 | 1.187 | 0.90 | 0.283 | −0.067 | 0.90 | 0.720 | −0.582 | 0.90 |
| −0.391 | 0.896 | 0.90 | 0.399 | −0.262 | 0.90 | 0.713 | −0.761 | 0.90 |
| −0.238 | 0.729 | 0.90 | 0.517 | −0.456 | 0.90 | 0.740 | −0.623 | 0.90 |
| −0.103 | 0.547 | 0.90 | 0.638 | −0.647 | 0.90 | 0.644 | −0.418 | 0.90 |
| −0.815 | 1.203 | 0.92 | 0.308 | −0.119 | 0.92 | 0.367 | 0.129 | 0.92 |
| −0.812 | 1.158 | 0.92 | 0.331 | −0.157 | 0.92 | 0.346 | 0.168 | 0.92 |
| −0.783 | 1.126 | 0.92 | 0.354 | −0.196 | 0.92 | 0.325 | 0.208 | 0.92 |
| −0.740 | 1.112 | 0.92 | 0.377 | −0.234 | 0.92 | 0.304 | 0.247 | 0.92 |
| −0.697 | 1.100 | 0.92 | 0.400 | −0.273 | 0.92 | 0.282 | 0.287 | 0.92 |
| −0.655 | 1.086 | 0.92 | 0.424 | −0.311 | 0.92 | 0.260 | 0.326 | 0.92 |
| −0.613 | 1.070 | 0.92 | 0.447 | −0.349 | 0.92 | 0.239 | 0.365 | 0.92 |
| −0.573 | 1.050 | 0.92 | 0.470 | −0.387 | 0.92 | 0.216 | 0.404 | 0.92 |

TABLE II-continued

| X | Y | Z' | X | Y | Z' | X | Y | Z' |
|---|---|---|---|---|---|---|---|---|
| −0.534 | 1.028 | 0.92 | 0.494 | −0.425 | 0.92 | 0.194 | 0.442 | 0.92 |
| −0.497 | 1.003 | 0.92 | 0.517 | −0.463 | 0.92 | 0.171 | 0.481 | 0.92 |
| −0.462 | 0.975 | 0.92 | 0.541 | −0.501 | 0.92 | 0.148 | 0.519 | 0.92 |
| −0.428 | 0.946 | 0.92 | 0.565 | −0.539 | 0.92 | 0.125 | 0.558 | 0.92 |
| −0.396 | 0.915 | 0.92 | 0.589 | −0.577 | 0.92 | 0.101 | 0.596 | 0.92 |
| −0.365 | 0.883 | 0.92 | 0.613 | −0.614 | 0.92 | 0.077 | 0.633 | 0.92 |
| −0.335 | 0.849 | 0.92 | 0.637 | −0.652 | 0.92 | 0.053 | 0.671 | 0.92 |
| −0.305 | 0.815 | 0.92 | 0.661 | −0.690 | 0.92 | 0.028 | 0.708 | 0.92 |
| −0.277 | 0.781 | 0.92 | 0.685 | −0.728 | 0.92 | 0.003 | 0.745 | 0.92 |
| −0.249 | 0.746 | 0.92 | 0.715 | −0.761 | 0.92 | −0.022 | 0.782 | 0.92 |
| −0.222 | 0.710 | 0.92 | 0.757 | −0.757 | 0.92 | −0.048 | 0.819 | 0.92 |
| −0.195 | 0.674 | 0.92 | 0.774 | −0.718 | 0.92 | −0.075 | 0.855 | 0.92 |
| −0.169 | 0.638 | 0.92 | 0.758 | −0.676 | 0.92 | −0.102 | 0.891 | 0.92 |
| −0.143 | 0.602 | 0.92 | 0.739 | −0.636 | 0.92 | −0.129 | 0.926 | 0.92 |
| −0.118 | 0.565 | 0.92 | 0.720 | −0.595 | 0.92 | −0.157 | 0.961 | 0.92 |
| −0.093 | 0.528 | 0.92 | 0.701 | −0.554 | 0.92 | −0.186 | 0.995 | 0.92 |
| −0.068 | 0.490 | 0.92 | 0.683 | −0.514 | 0.92 | −0.216 | 1.028 | 0.92 |
| −0.044 | 0.453 | 0.92 | 0.664 | −0.473 | 0.92 | −0.247 | 1.061 | 0.92 |
| −0.019 | 0.415 | 0.92 | 0.645 | −0.433 | 0.92 | −0.278 | 1.092 | 0.92 |
| 0.005 | 0.377 | 0.92 | 0.626 | −0.392 | 0.92 | −0.311 | 1.123 | 0.92 |
| 0.029 | 0.340 | 0.92 | 0.607 | −0.352 | 0.92 | −0.345 | 1.152 | 0.92 |
| 0.052 | 0.302 | 0.92 | 0.587 | −0.311 | 0.92 | −0.380 | 1.179 | 0.92 |
| 0.076 | 0.264 | 0.92 | 0.568 | −0.271 | 0.92 | −0.417 | 1.204 | 0.92 |
| 0.099 | 0.226 | 0.92 | 0.548 | −0.231 | 0.92 | −0.456 | 1.227 | 0.92 |
| 0.123 | 0.187 | 0.92 | 0.529 | −0.191 | 0.92 | −0.496 | 1.247 | 0.92 |
| 0.146 | 0.149 | 0.92 | 0.509 | −0.151 | 0.92 | −0.538 | 1.263 | 0.92 |
| 0.169 | 0.111 | 0.92 | 0.489 | −0.110 | 0.92 | −0.581 | 1.276 | 0.92 |
| 0.193 | 0.073 | 0.92 | 0.469 | −0.070 | 0.92 | −0.625 | 1.284 | 0.92 |
| 0.216 | 0.034 | 0.92 | 0.449 | −0.030 | 0.92 | −0.669 | 1.286 | 0.92 |
| 0.239 | −0.004 | 0.92 | 0.428 | 0.010 | 0.92 | −0.714 | 1.281 | 0.92 |
| 0.262 | −0.042 | 0.92 | 0.408 | 0.049 | 0.92 | −0.756 | 1.266 | 0.92 |
| 0.285 | −0.081 | 0.92 | 0.387 | 0.089 | 0.92 | −0.792 | 1.240 | 0.92 |

The origin of the X, Y coordinate values of Table I are identical to the origin of the X, Y coordinate values of Table II.

In the preferred embodiment of the second stage bucket hereof, the datum U is 24.100 inches from the engine or rotor centerline. The bucket radial height is 11.280 inches from the datum to the cutter tooth on the tip shroud 40. Consequently, the bucket radial height from the engine centerline is 35.380 inches. The airfoil sections start at Z=0% span, which is 2.221 inch from datum U (26.321 inches from the engine centerline). The airfoil sections end at Z=100% span, which is 11.122 inches from datum U (35.22 inches from the engine centerline). With respect to the non-dimensionalized value Z in Table I, Z=0.088 or 8.8% span, which corresponds to 3.005 inches from datum U (27.15 inches from the engine centerline). The Z value of Table I at 0.92 or 92% span corresponds to a distance of 10.410 inches from datum U (34.510 inches from the engine centerline).

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An air cooled bucket for a turbine comprising:
    an airfoil having a plurality of cooling holes extending between root and tip portions of the airfoil and exiting at the tip of the airfoil;
    said plurality of cooling holes including first, second and third sets of holes with each set of holes having at least two holes;
    said first set of holes extending adjacent a leading edge of said airfoil, said second set of holes extending intermediate said first and third sets of holes and said third set of holes extending adjacent said trailing edge;
    said two holes of each said first, second and third sets of holes including at least two of the holes numbered 1–4, 5–7 and 8–10 respectively, and located in accordance with X, Y Cartesian coordinate values set forth in Table I at tip and root portions of said airfoil.

2. A bucket according to claim 1 wherein said two holes of said first set of holes have turbulators spaced one from the other along said holes and terminating short of said root and tip portions of said airfoil.

3. A bucket according to claim 1 wherein said two holes of said second set of holes have turbulators spaced one from the other along said holes and terminating short of said root and tip portions of said airfoil.

4. A bucket according to claim 3 wherein said two holes of said first set of holes have turbulators spaced one from the other along said holes and terminating short of said root and tip portions of said airfoil.

5. A bucket according to claim 4 wherein said two holes of said third set of holes have smooth bores throughout their full extent.

6. A bucket according to claim 1 wherein said airfoil includes a shank and a dovetail, said two holes of each of said first, second and third sets of holes extending through said shank and said dovetail terminating in inlet openings and located in accordance with X, Y coordinate values set forth in Table I of said inlet openings.

7. A bucket according to claim 6 wherein said two holes of each said first, second and third sets of holes have smooth bores in said shank and said dovetail of said airfoil.

8. A bucket according to claim 1 wherein said first, second and third sets of holes include four holes, three holes and three holes, respectively, numbered 1–4, 5–7 and 8–10 in Table I and located in accordance with respective corresponding X, Y coordinate values set forth in Table I at tip and root portions of said airfoil.

9. A bucket according to claim 1 wherein said two holes of said first set of holes have turbulators spaced one from the other therealong commencing and ending at about 30–40% and 75–85%, respectively, of the airfoil length from the root portion to the tip portion.

10. A bucket according to claim 1 wherein said two holes of said second set of holes have turbulators spaced one from the other therealong commencing and ending at about 45–55% and 70–80%, respectively, of the airfoil length from the root portion to the tip portion.

11. A bucket according to claim 10 wherein said two holes of said first set of holes have turbulators spaced one from the other therealong commencing and ending at about 30–40% and 75–85%, respectively, of the airfoil length from the root portion to the tip portion. the diameters of the two holes of the first set of holes being greater than the diameters of the two holes of the second set of holes.

12. A bucket according to claim 11 wherein said turbulators comprise radially inwardly projecting ribs in each of the turbulated holes.

13. A bucket according to claim 1 wherein said airfoil has an airfoil shape, the airfoil having a nominal profile substantially in accordance with Cartesian coordinate values of X, Y and Z set forth in Table II wherein the Z values are non-dimensional values from 0.088 to 0.92 convertible to Z distances an inches by multiplying the Z values by a height of the airfoil in inches, and wherein X and Y are distances in inches which, when connected by smooth continuing arcs, define airfoil profile sections at each distance Z, the profile sections at the Z distances being joined smoothly with one another to form a complete airfoil shape, said coordinate value Z extending along a radius from a centerline of the turbine and through an origin of the X, Y coordinate values of Table I.

14. An air cooled bucker for a turbine comprising:
an airfoil having a plurality of cooling holes extending between root and tip portions of the airfoil and exiting at the tip of the airfoil;
said plurality of cooling holes including first, second and third sets of holes with each set of holes having at least two holes;
said first set of holes extending adjacent a leading edge of said airfoil, said second set of holes extending intermediate said first and third sets of holes and said third set of holes extending adjacent said trailing edge;
said two holes of one of said first set of holes and said second set of holes having turbulators spaced one from the other alone said holes and terminating short of said root and tip portions of said airfoil; said two holes of each of said first set of holes and said second set of holes having turbulators spaced one from the other alone said holes and terminating short of said root and tip portions of said airfoil, said two holes of said third set of holes having smooth bores throughout their full extent.

15. An air cooled bucket for a turbine comprising:
an airfoil having a plurality of cooling holes extending between root and tip portions of the airfoil and exiting at the tip of the airfoil;
said plurality of cooling holes including first, second and third sets of holes with each set of holes having at least two holes;
said first set of holes extending adjacent a leading edge of said airfoil said second set of holes extending intermediate said first and third sets of holes and said third set of holes extending adjacent said trailing edge;
said two holes of one of said first set of holes and said second set of holes having turbulators spaced one from the other alone said holes and terminating short of said root and tip portions of said airfoil;
said two holes of said second set of holes having turbulators spaced one from the other therealong commencing and ending at about 45–55% and 70–80%, respectively of the airfoil length from the root portion to the tip portion;
said two holes of said first set of holes having turbulators spaced one from the other therealong commencing and ending at about 30–40% and 75–85%, respectively, of the airfoil length from the root portion to the tip portion;
said two holes of said third set of holes having smooth bores throughout their full extent.

16. A bucket according to claim 2 wherein diameters of (i) smooth bore portions of the first set of holes between the root portions and commencement of the turbulators and (ii) smooth bore portions at the first set of holes from outermost turbulators to tip portions are about 0.090 inches, the outer diameter of the turbulated holes of the first set of holes being about 0.115 inches.

17. A bucket according to claim 3 wherein diameters of (i) smooth bore portions of the second set of holes from the root portions to commencement of the turbulators and (ii) smooth bore portions of the second set of holes from the outermost turbulators to tip portions are about 0.065 inches, the outer diameter of the turbulators of the second set of holes being about 0.085 inches.

* * * * *

UNITED STATES PATENT AND TRADEMARK OFFICE
CERTIFICATE OF CORRECTION

PATENT NO. : 6,910,864 B2
DATED : June 28, 2005
INVENTOR(S) : Tomberg

It is certified that error appears in the above-identified patent and that said Letters Patent is hereby corrected as shown below:

Column 19,
Line 39, the word "bucker" should read -- bucket --.

Column 20,
Lines 1, 5 and 22, the word "alone" should read -- along --.

Signed and Sealed this

Twenty-second Day of November, 2005

JON W. DUDAS
*Director of the United States Patent and Trademark Office*